Dec. 29, 1925.

A. C. P. RUSSEN 1,567,681

PERFORATING MACHINE

Filed Nov. 17, 1923      12 Sheets-Sheet 1

INVENTOR.
Anthony C. P. Russen
BY
Wooster & Davis
ATTORNEYS.

Dec. 29, 1925.

A. C. P. RUSSEN 1,567,681

PERFORATING MACHINE

Filed Nov. 17, 1923     12 Sheets-Sheet 2

Inventor

Anthony C. P. Russen

By Wooster & Davis

Attorneys

Dec. 29, 1925.  A. C. P. RUSSEN  1,567,681
PERFORATING MACHINE
Filed Nov. 17, 1923   12 Sheets-Sheet 3

INVENTOR
Anthony C. P. Russen
BY
Wooster & Davis
ATTORNEYS.

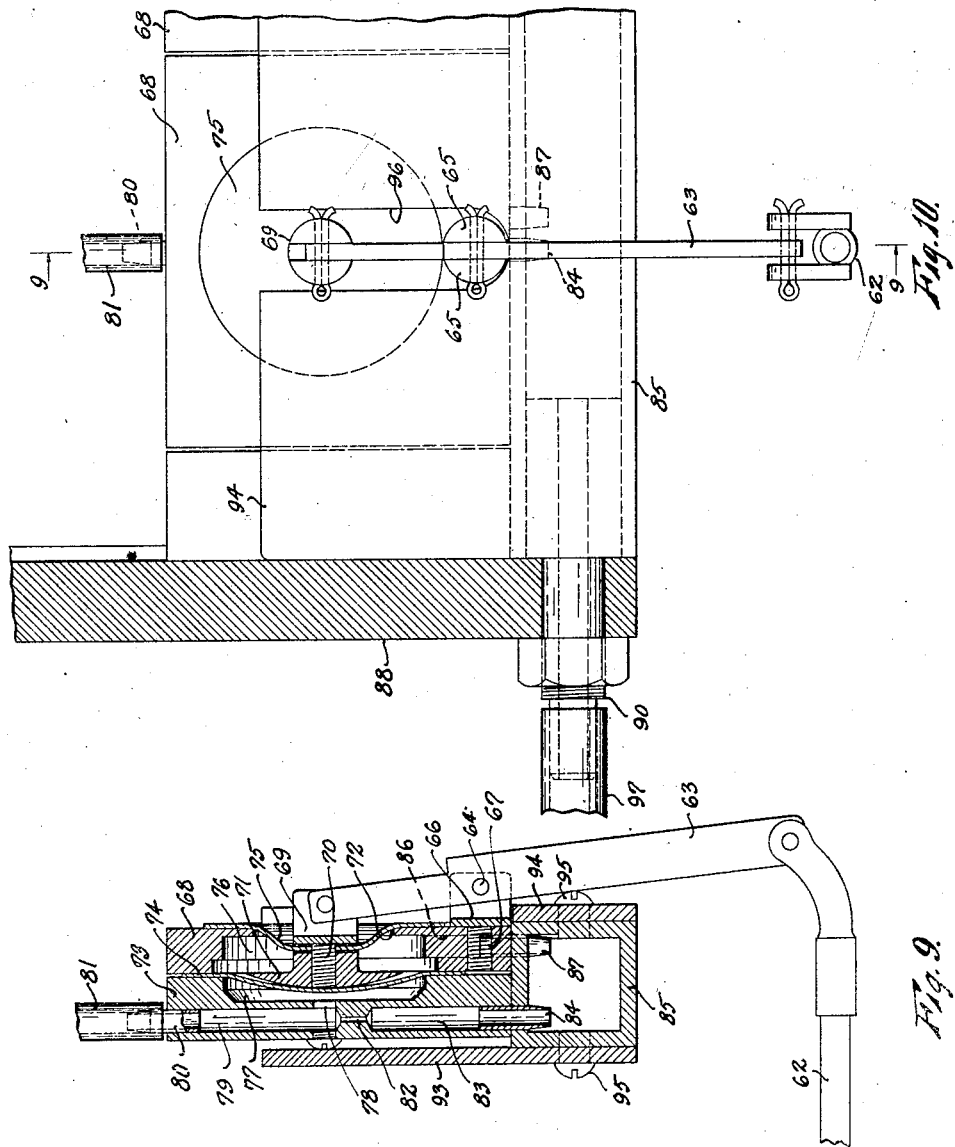

Dec. 29, 1925.
A. C. P. RUSSEN
PERFORATING MACHINE
Filed Nov. 17, 1923   12 Sheets-Sheet 9
1,567,681
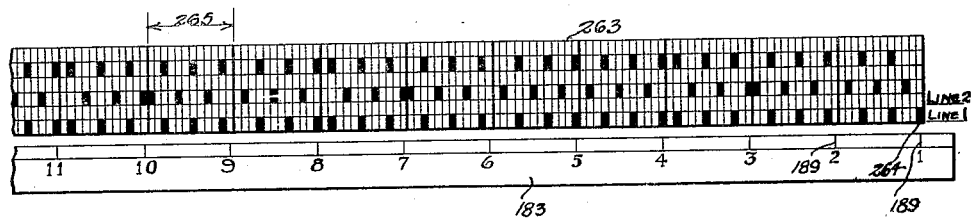
Fig. 12.
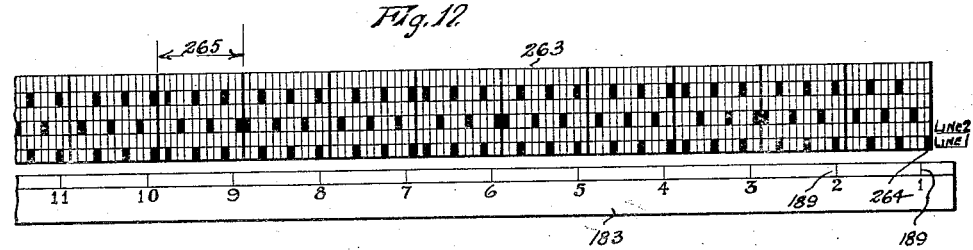
Fig. 18.
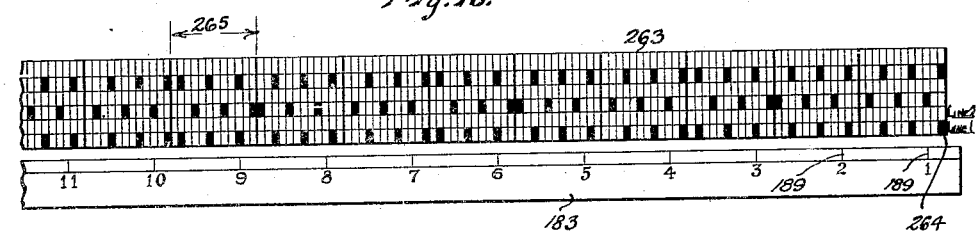
Fig. 19.
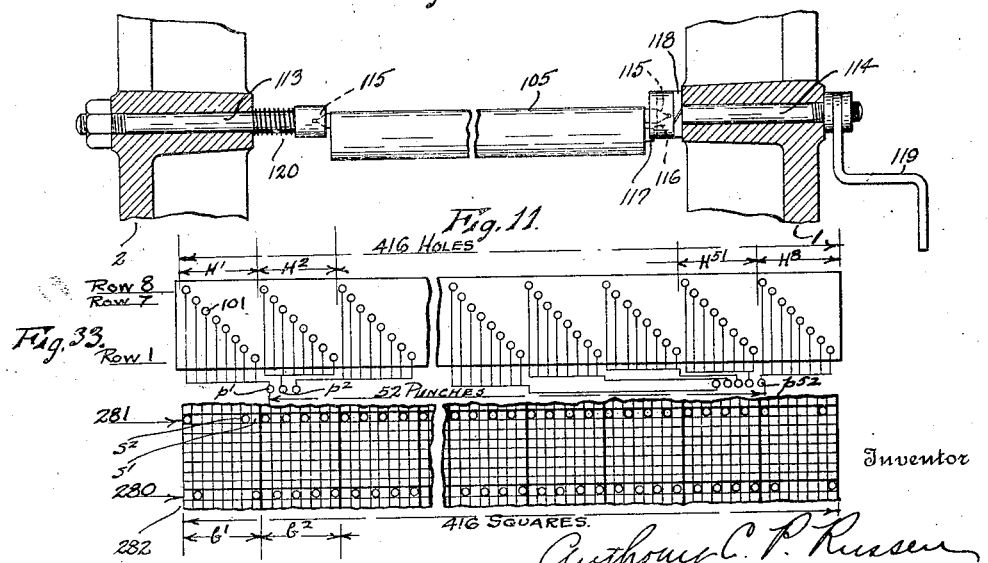
Fig. 11.
Fig. 33.
Fig. 34.
Inventor
Anthony C. P. Russen
By Wooster & Davis
Attorneys

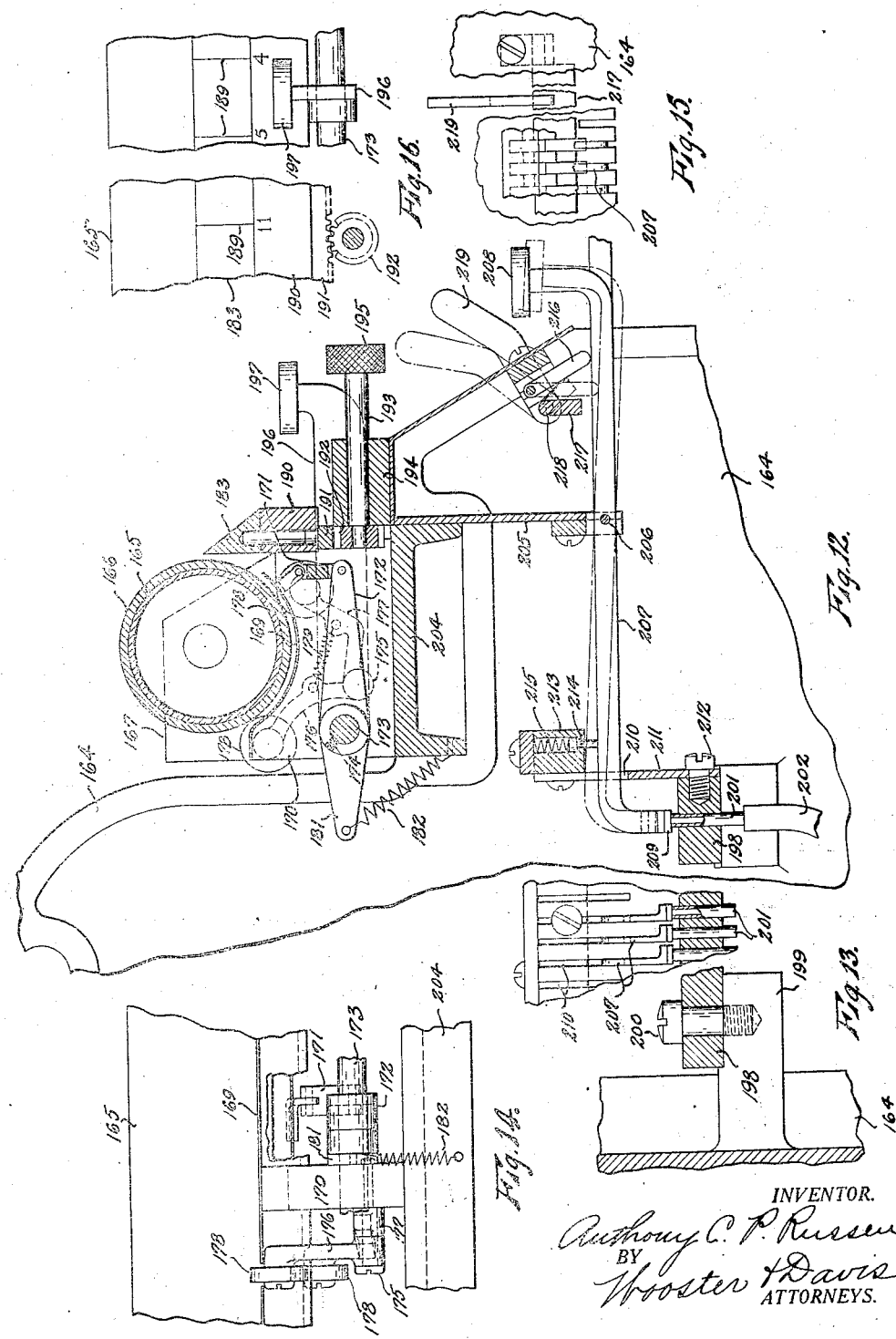

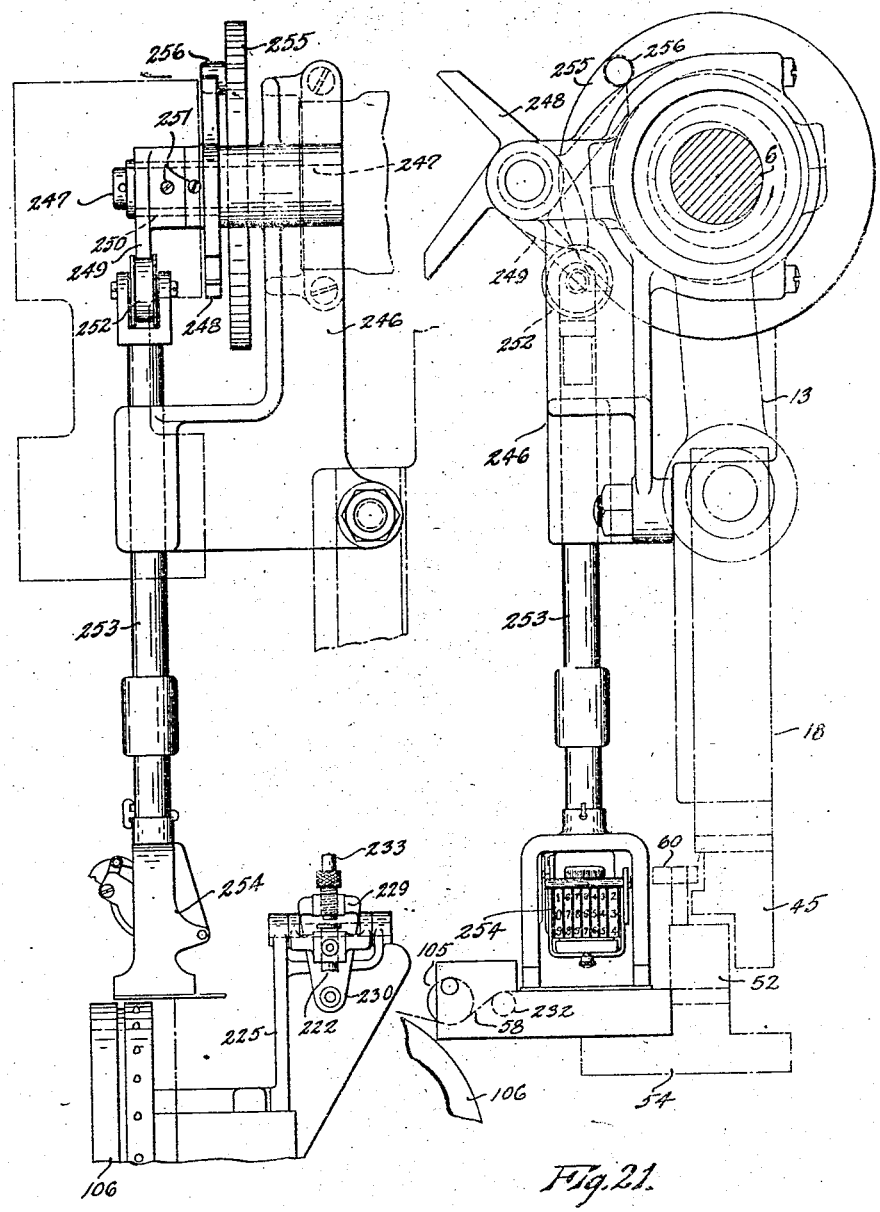

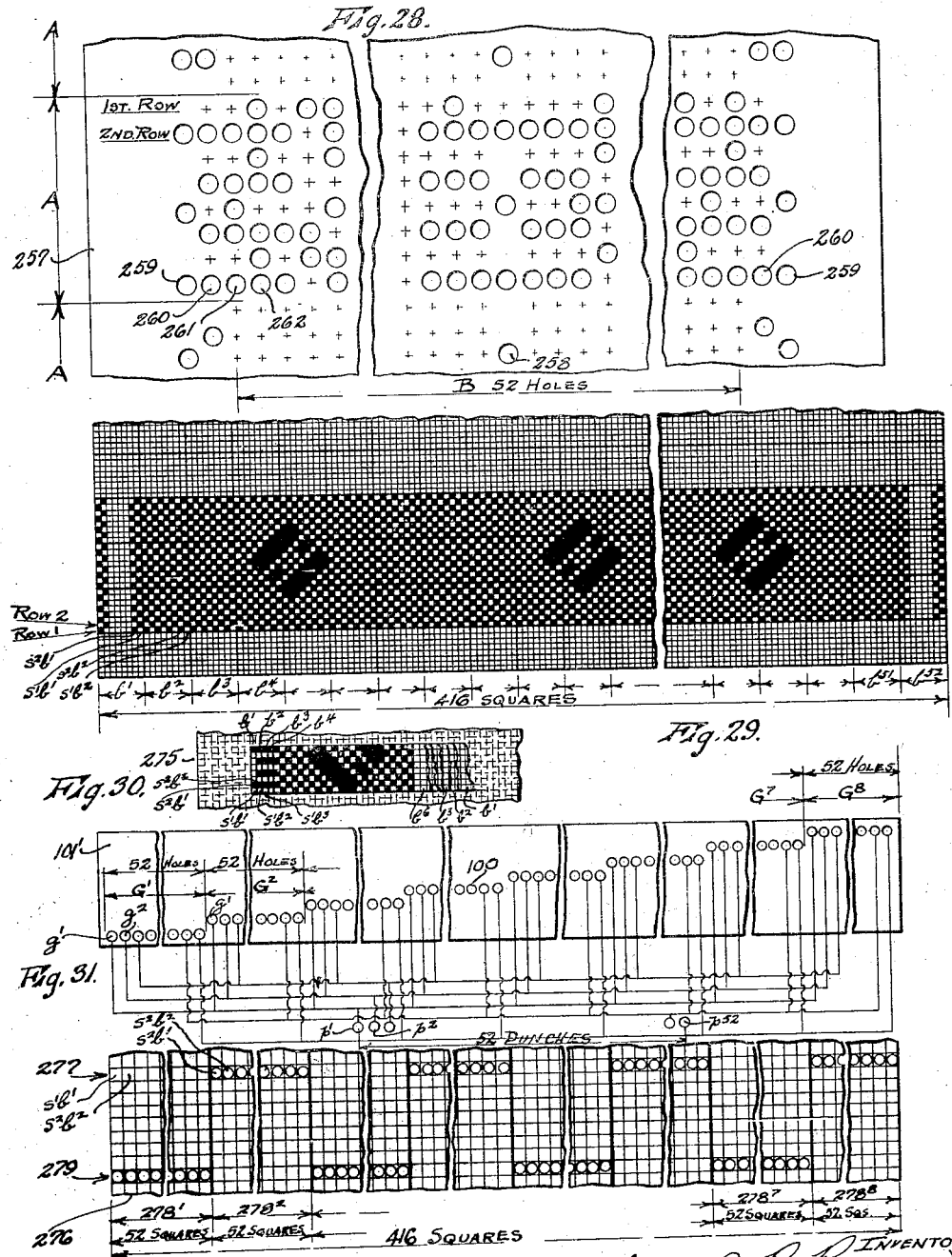

Patented Dec. 29, 1925.

1,567,681

UNITED STATES PATENT OFFICE.

ANTHONY C. P. RUSSEN, OF EDGEWOOD, RHODE ISLAND.

PERFORATING MACHINE.

Application filed November 17, 1923. Serial No. 675,267.

*To all whom it may concern:*

Be it known that I, ANTHONY C. P. RUSSEN, a citizen of the United States, residing at Edgewood, county of Providence, State of Rhode Island, have invented a new and useful Perforating Machine, of which the following is a specification.

This invention relates to a machine for perforating continuous strips of paper, or other flexible material, to produce in these strips the card design for use in controlling the threads in a Jacquard loom, and especially to a machine for perforating the strips to be used in the improved controlling mechanism disclosed in my copending application for a loom attachment, Serial No. 643,488, filed June 5, 1923.

It is an object of the invention to provide a device in which the master rolls may be perforated, and also in which any number of copies may be produced from the master roll.

It is also an object of the invention to provide a device in which the master roll may be punched direct from a design sheet without the necessity of reading the design as in the present method.

It is a further object of the invention to provide a machine in which in punching the holes for the control card a continuous row running the length of the card may be punched at one time, instead of the short row of holes running the width of the card as in the present method, thus giving much more rapid operation.

It is a still further object of the invention to provide a device in which the design may be read direct from the design sheet and the corresponding holes punched in the master, a complete row throughout the length of the card being punched at one time.

With the foregoing and other objects in view, I have devised the construction illustrated in the accompanying drawings, forming a part of this specification and in which similar reference characters are used throughout the various figures to designate corresponding elements. In these drawings, Fig. 1 is a side elevation of the complete machine, looking from the left or the hand wheel side.

Fig. 9 is a transverse section through one of the punch control mechanisms, the section being taken substantially on line 9—9 of Fig. 10.

Fig. 10 is a front elevation thereof looking from the right of Fig. 9.

Fig. 11 is a side elevation of one of the adjustable tension rods showing the method of mounting the same in the frame.

Fig. 12 is a transverse section through the master attachment for controlling the perforation of the master roll.

Fig. 13 is a detailed sectional view of a portion of the subtracker bar looking from the left of Fig. 12.

Fig. 14 is a rear elevation of a portion of the mechanism for holding the design sheet, looking from the left of Fig. 12.

Fig. 15 is a front elevation of some of the keys and the release mechanism therefor, looking from the right of Fig. 12.

Fig. 16 is a detailed view of the reading scale shifting mechanism, looking from the right of Fig. 12.

Figs. 17, 18 and 19 are three views of a portion of the design sheet and the reading scale, illustrating the method of reading the design to transfer it to the master roll.

Fig. 20 is a side elevation of the numbering attachment showing the method of applying it to the machine.

Fig. 21 is a side elevation thereof, looking from the right of Fig. 20.

Fig. 22 is a section through the clutch for driving the main shaft, the section being substantially on line 22—22 of Fig. 23.

Fig. 23 is an end view of the clutch.

Fig. 24 is a side view showing also the trip dog.

Fig. 25 is a view of the trip dog looking from the left of Fig. 24.

Fig. 26 is a top plan view of a portion of the slide comb.

Fig. 27 is a rear elevation thereof.

Fig. 28 is a view showing a portion of the continuous strip of flexible material.

Fig. 29 is a plan view of a portion of a design sheet.

Fig. 30 is a plan view of a section of a design sheet showing how a design sheet may be arranged to be passed over a tracker bar having the same number of holes as the number of punches and transfer the design directly to the copies without the necessity of reading the design.

Fig. 31 is a diagrammatic view showing how the openings may be arranged in a tracker bar, where the number of openings equal the number of needles in the control head but the number of punches equal only to the number of needles in one of the longitudinal rows of the head.

Fig. 32 shows a portion of a design sheet to be used with the tracker bar of Fig. 31 to transfer the design directly to the control strip.

Fig. 33 is a diagrammatical view showing another arrangement for the openings in the tracker bar which may be employed Fig. 34 shows a section of a design sheet to be employed therewith.

Figure 1:
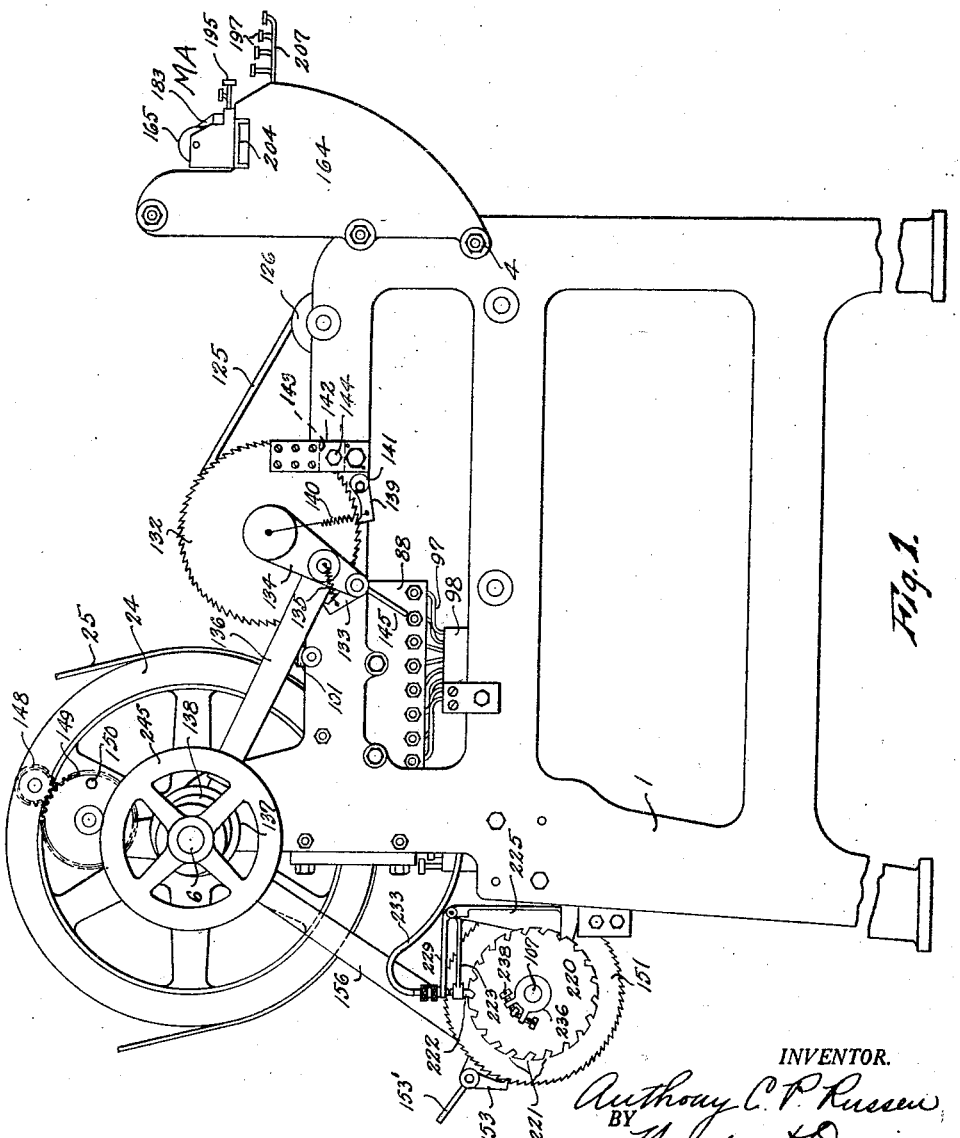
Figure 2:
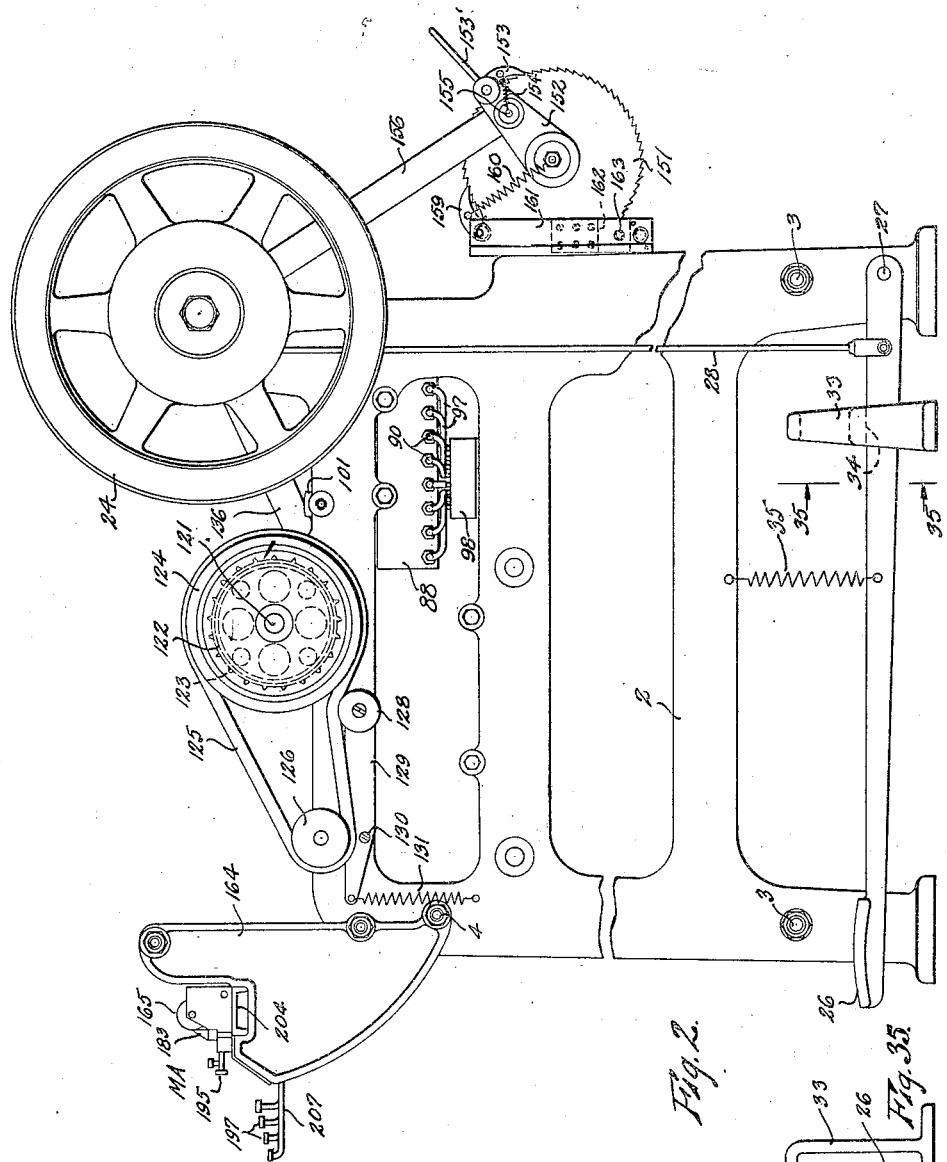
Fig. 2 is a side elevation looking from the opposite side of the machine.
Figure 35:
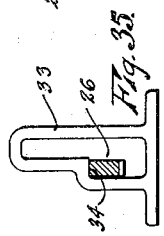
Fig. 35 is a detail view of the retaining means for the treadle taken substantially on line 35—35 of Fig. 2.

The frame of the machine comprises two side members 1 and 2 respectively connected together by suitable tie-rods 3 and 4 and the separator 5.

Mounted between the end members and extending transversely of the machine is a main shaft 6 mounted to rotate in suitable bearings 7 in the end members. Also carried by these end members above the main shaft is a backer supporting rod 8, carrying suitable backers 9. The backers are secured against longitudinal movement on the rod 8 by suitable set screws 9', and have a bearing at their lower ends, as shown at 10 in Fig. 5, on the top of the main shaft to take a portion of the strain of operating the punches from the main shaft. The main shaft has a pair of eccentrics 11 embraced by the bearings 12 on one end of the connecting rods 13, the other ends of the connecting rods being provided with bearings 14 embracing eccentrics 15 on a shaft 16.

The shaft 16 is also embraced by bearings 17 carried on the upper side of the gate 18, and these bearings are secured to the shaft by suitable set screws 19. Intermediate the bearings 17 the shaft 16 is provided with suitable means to facilitate rotation thereof, such as transverse openings 20 to receive a rod. By loosening the set screws 19 this shaft may be rotated by a suitable rod in the opening 20, and by rotation of the eccentrics 15 will adjust the gate vertically to be properly located with reference to the die-bed as will later appear. Secured to the outer ends of the gate are bearing locks 21 adapted to slide in suitable vertical bearings carried by the frame, one of the sides of this bearing being provided by the plates 22 secured to the frame by suitable bolts 23. As the main shaft is rotated the eccentrics carried by this shaft will raise and lower the gate and with it the punches, as will presently be described.

The main shaft is driven by any suitable means such as a pulley and fly wheel 24 mounted on the shaft, and arranged to be connected to the shaft for driving it by a suitable manually operated clutch mechanism, the pulley or fly wheel 24 being driven by a belt 25 leading from any suitable source of power, not shown. The details of the clutch mechanism are shown in Figs. 22 to 25. The clutch is so arranged that if the operator depresses the treadle 26 and immediately releases it, the main shaft will be given one complete revolution and then the clutch will be disconnected and the shaft will stop, but if the treadle is depressed and retained in this depressed position the main shaft will continue to rotate. The treadle is pivoted to the frame at 27 and is connected by means of a rod 28 to a dog 29 pivoted to the frame at 30, which dog at its upper end carries a sliding pin 31 normally held in extended position by a spring 32, and embracing the treadle is a hook member 33 provided with a shoulder 34 to retain the treadle in depressed position when placed under this shoulder, the treadle being normally elevated by the spring 35.

The clutch comprises a ring 36 carried in the fly wheel mounted therein by a forced fit so that it will rotate with the wheel. This ring embraces the projecting lugs 37 on a dog ring 38, between which lugs are mounted a plurality of rollers 39. The dog ring also carries a lug 40 on the outer wall thereof in alignment with the pin 31 carried by the dog 29. Keyed to the shaft is a cam 41 having in its periphery a plurality of curved recesses 42 one for each roller 39. The dog ring is mounted to rotate on a bushing 44 keyed to the shaft. When the treadle is elevated the pin 31 is in alignment with the lug 40 on the dog ring and will be engaged thereby so that the ring will be held stationary. This will hold the rollers 39 stationary and allow the pulley to rotate on the shaft. When the treadle is depressed the pin 31 is moved outwardly away from the lug 40 allowing the dog ring 38 to rotate with the pulley which will bind the rollers 39 between the cam and the inner wall of the ring 36 so that the shaft will rotate with the pulley. If the treadle is immediately released the spring 35 will raise it bringing the pin 31 back into the path of the lug 40 and at the completion of the revolution this lug will engage the pin, the dog ring 38 will be prevented from further rotation and the clutch will be released allowing the pulley to rotate without rotating the shaft. When the treadle is depressed, if instead of being released it is moved under the shoulder 34 the pulley will continue to rotate the shaft.

Secured to the lower end of the gate 18 so as to reciprocate vertically with said gate is a member 45 which I call a slide comb shown in detail in Figs. 5, 6, 26 and 27, and this comb carries the punches 46 and the slides 47 for controlling the punches. Extending vertically through the projecting ledge 48 are a series of openings 49 in which the punches are mounted for reciprocatory movement, the enlarged heads 50 of the punches normally resting on the top of this ledge. Extending transversely on the top of the comb are a plurality of grooves 51 in which the slides 47 are mounted to reciprocate, there being one groove and one slide in alignment with each punch. The lower portions of the punches are mounted to slide in suitable openings in a stationary guide block 52 extending transversely of the machine, above the die 53 and provided with an opening in alignment with each punch is a die 53 mounted on a die-bed 54 secured to the separator 5 by means of the securing screws 55. See particularly Figs. 5 and 6. These screws extend through elongated slots 56 to allow a limited adjustment for the die-bed and the die. The die-bed is provided with a suitable slot 57 in alignment with the openings in the punch to allow for the passage of the punchings from the die. The guide block 52 is spaced a suitable distance above the die to allow for the passage of one or more strips of paper or other suitable flexible material 58 upon which the dies are to operate.

Carried by the guide block 52 are upright pins 59 to which is adjustably secured a stop bar 60 to limit the movement of the slides 47, the stop bar being secured to the pins 59 by any suitable means, such as set screws 61.

The slides 47 are controlled by suitable pneumatic action devices one for each slide shown in detail in Figs. 9 and 10. To each slide is connected an adjustable rod 62 pivoted at its opposite end to a lever 63, this lever being fulcrumed at 64 between the wings 65 of a supporting element 66 provided with a threaded extension 67 threaded into the pneumatic block 68, and the upper end of this lever is pivoted to a similar element 69 having an extension 70 threaded into the button 71.

The pneumatic block 68 has an opening 72 therein through which the element 69 extends, and is open at its rear side which is closed by a cap 73 there being placed between the cap and the block a flexible rubber diaphragm 74 against which the button 71 rests. The opening 72 is also closed by a similar diaphragm 75 shellaced to the face of the block 68, and this diaphragm is clamped between the button 71 and the element 69. Thus there are two chambers formed, a chamber 76 in the pneumatic block between the diaphragms 74 and 75 and a chamber 77 in a cap 73 on the opposite side of the diaphragm 74. Leading from this chamber is an opening 78 through a passage 79 connected at its upper end, as by means of a suitable nipple 80, with a tube 81. Beneath the openings 77 is a restricted orifice 82 leading to a passage 83 connected by a nipple 84 to the interior of the vacuum tube 85. There is also a passage 86 leading from the chamber 76 through a similar nipple 87 to the interior of the vacuum tube so that both chambers 76 and 77 are connected with the vacuum tube, but the chamber 77 is connected therewith only through a restricted orifice.

Figure 7:
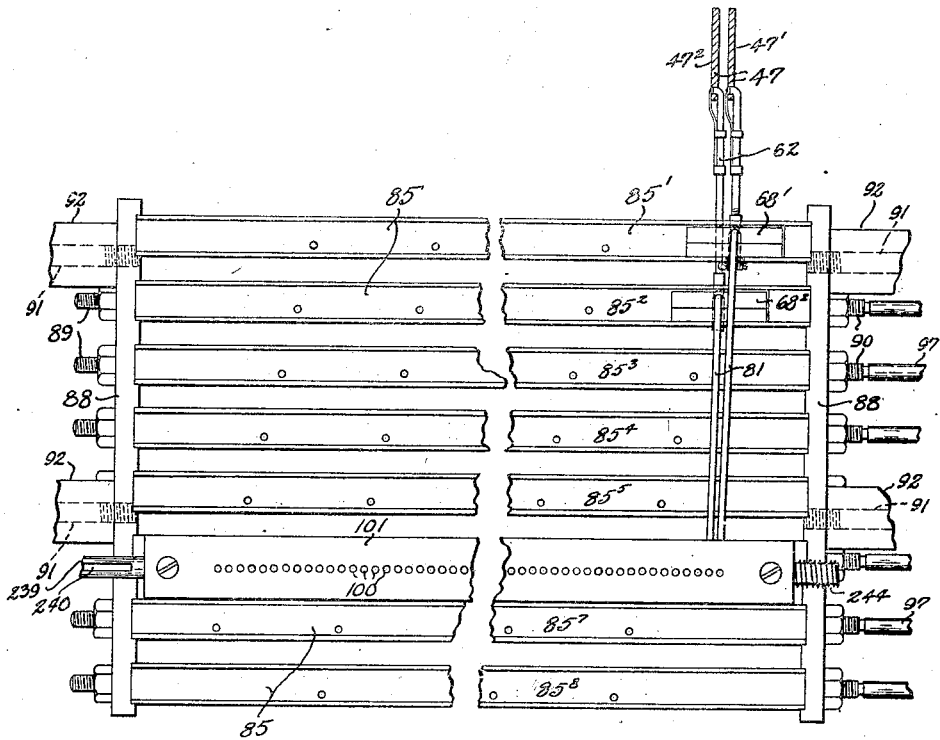
Fig. 7 is a detailed plan view showing the method of locating the punch control mechanisms.

The vacuum tubes 85 are preferably rectangular in cross section and extend transversely of the machine between the sides of the frame with their ends seated in grooves in suitable side plates 88 and connected therewith by suitable bolts 89 at one end and nipples 90 at the other end. The plates 88 are mounted in the frame by any suitable means, such as bolts 91, surrounded by suitable spacing elements 92. There are a number of these vacuum tubes depending upon the number of punches used, and each tube supports a number of pneumatic blocks which are arranged, as shown in Fig. 7, that is the first side 47' to be operated by a pneumatic action 68' is mounted on the first vacuum tube 85'. The next slide $47^2$ will be operated by a pneumatic action $68^2$ mounted on the second vacuum tube $85^2$ but the blocks 68' will not be in alignment with the block $68^2$ but it will be shifted laterally a distance corresponding to the distance between the sides 47' and $47^2$, or that is, the distance between the punches, and this same arrangement will be carried throughout the entire set of the pneumatic actions, as shown in Fig. 7. To back up the blocks 68 and the cap 73, spring plates 93 and 94 are secured on opposite sides of the vacuum tubes, as by suitable screws 95, the plate 94 being provided with suitable slots or notches 96 for passage of the elements 66 and 69. Each of the nipples 90 are connected by means of a flexible tube 97 to a distributor block 98 which is connected in turn by a suitable pipe connection 99 to any suitable vacuum pump, not shown.

Figure 6:
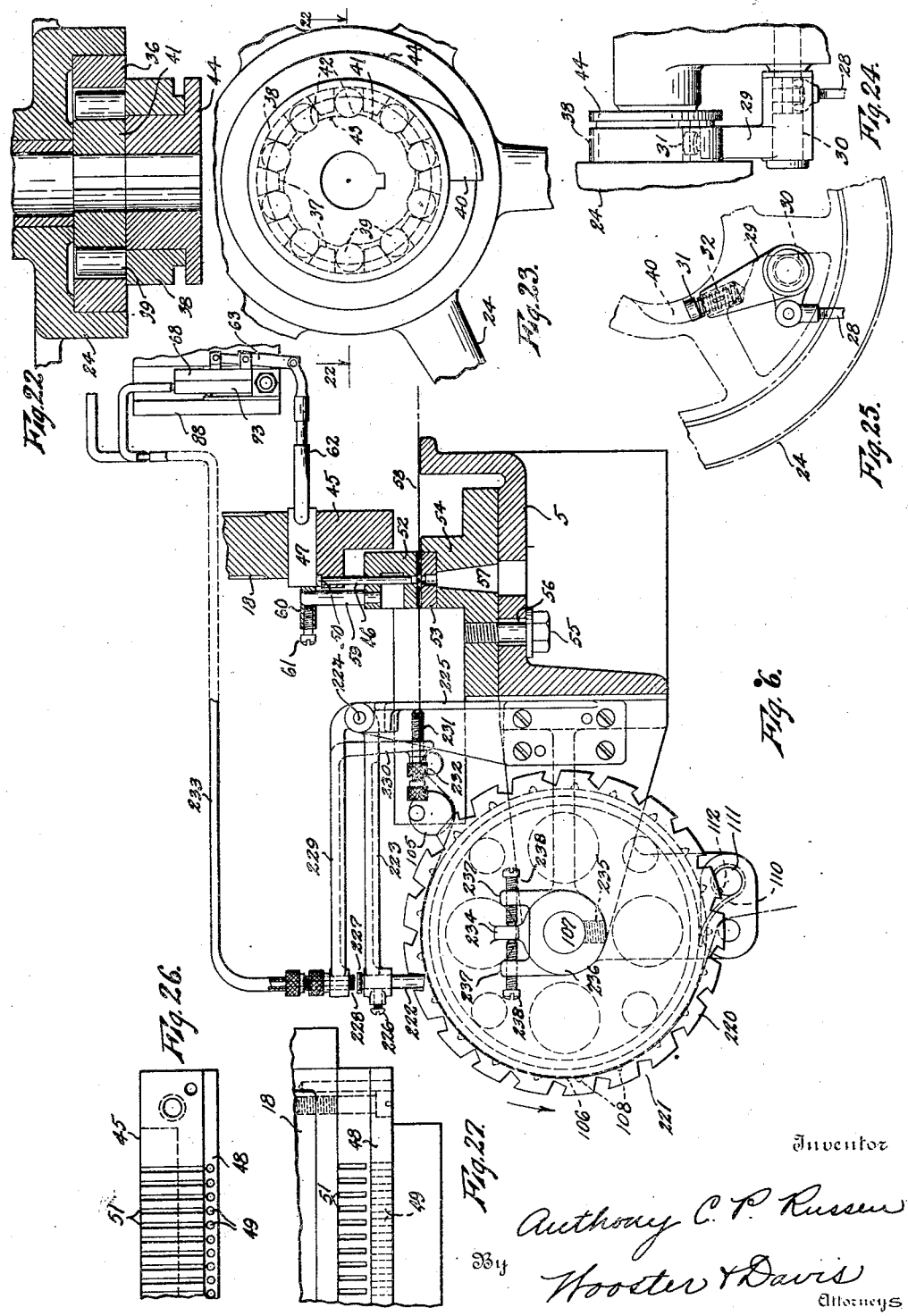
Fig. 6 is a side elevation of the mechanism for controlling the punching of the guide holes at the sides and center of the strip, the punching mechanism being shown in section.

The flexible tubes 81 each lead to an opening 100 in the main tracker bar 101. The operation of this pneumatic action is as follows:

The pressure in the chamber 76 will be less than atmospheric pressure as this chamber is connected by the nipple 87 with the vacuum tube 85 and when the opening in the tracker bar connected to the tube 81 is closed, as by means of an unperforated piece of paper placed on the tracker bar to prevent entrance of air, pressure in the chamber 77 will also be less than atmospheric and substantially the same as that in the chamber 76. Thus the atmospheric pressure on the diaphragm 75 will force it inwardly, as shown in Fig. 9, retracting the slide 47 connected therewith out of alignment with the end of the punch 46, and when the gate 18 and the slide comb are reciprocated there will be nothing to force the punch through any paper which may be over the die, the punch being free to slide in the comb. Should, however, the opening in the tracker bar be placed in communication with the atmosphere, as by an opening in the sheet of paper lying on the tracker bar coming into alignment with this opening, the pressure in the chamber 77 will be substantially equal to that of the atmosphere as the vacuum tube 85 acts only through the restricted orifice 82. The elasticity of the diaphragms 74 and 75 will then cause them to retract to the right, as shown in Fig. 9, and thus advance the slide 47 to a position over the head of the punch 46, as shown in Fig. 6. It will be apparent that if now the gate 18 is reciprocated the slide 47 will push the corresponding punch downwardly through whatever paper may be placed over the die.

Figure 3:
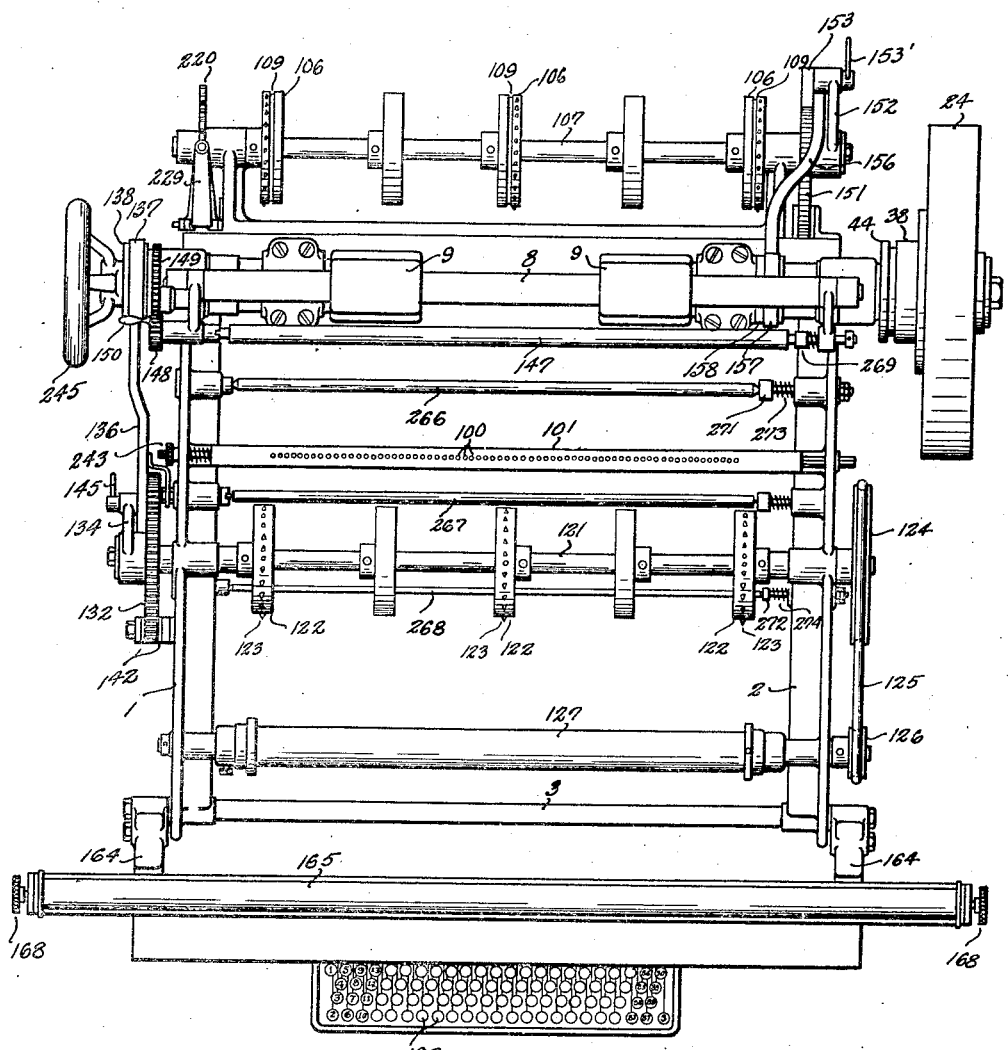
Fig. 3 is a top plan view of the complete machine.
Figure 4:
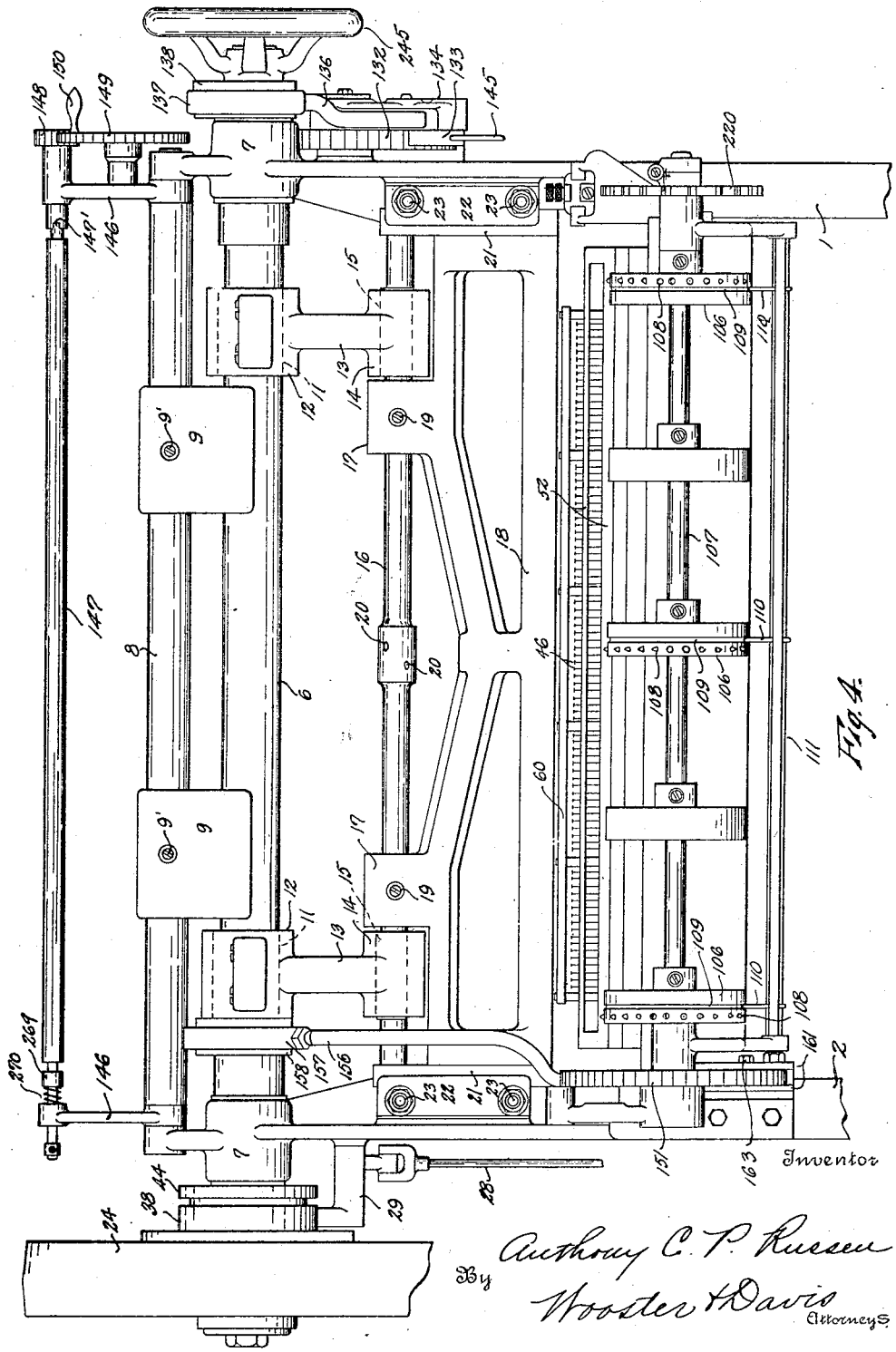
Fig. 4 is a rear end elevation.

Automatic means is provided for feeding the paper 58 through the die with a step by step movement in properly timed relation with the operation of the gate and the punches. Forwardly of the die and between the sides of the frame is a plate 102 forming a running in table or support for the paper and to guide the paper, either one or more sheets as desired, from a suitable source of supply, as for instance a roll 103 shown in broken lines in Fig. 5, mounted on any suitable support. After leaving the die the paper strip is led over a suitable rod 104 and under an eccentrically mounted tension rod 105 and then over the drums 106 and to a suitable windup mechanism not shown. There are preferably five of these drums, as shown in Figs. 3 and 4, mounted on a transverse shaft 107, and the two outer drums and the center drum are provided in their peripheries with a series of radially projecting pins or studs 108 adapted to enter perforations 258 and 259 along the opposite sides and the center of the paper strip, so that this paper will always be properly positioned with relation to the punches. The drums with these pins or studs are also provided with circumferential grooves 109 in which the free ends of strippers 110 extend as indicated in Figs. 4 and 6. These strippers comprise a piece of flat metal having one end wrapped around a rod 111 and projecting into a groove 112 in the rod so that they will be held in proper position. It will be clear that as the drums rotate these strippers will strip the sheet of paper from the pins or studs 108. The tension rod 105 is eccentrically mounted, the bearings, therefor, being set off center, as shown in Fig. 11. By swinging this rod the tension of the paper strip may be adjusted and also the paper may be adjusted with reference to the punches. This rod may be mounted by different constructions, but I prefer that substantially shown in Fig. 11, in which mounted in the frame of the machine are a pair of bolts 113 and 114 provided with tapered bearings for the eccentrically mounted tapered pins 115, one of these bolts, as 114, has a groove 116 in which the end of a stud 117 may project so that should the bolt be rotated the rod 105 will rotate with it. A spring washer 118 is mounted on this bolt to hold it tight in the frame and also to yieldingly hold it in adjusted position. Secured to the outer end of this bolt is a suitable handle 119 for rotating it, and there is also preferably a spring 120 on the bolt 113 tending to hold it against the rod 105 but adapted to allow it to yield as required to prevent binding of the rod in its bearings.

Extending transversely of the machine at one side of the main tracker bar is a shaft 121 carrying drums 122. There are preferably five of these drums, as shown in Fig. 3, the two outer ones and the central one being provided with a series of pins or studs 123 projecting radially from their peripheries to enter the guide openings 258 and 259 punched in the strip of flexible material so that the strip will always move in certain relation with these drums and cannot slide thereon, as will be apparent. On one end of the shaft 121 is a pulley 124 over which a belt 125 runs to a pulley 126 on a windup drum 127 so that this drum will be driven by this belt and pulley connection. Suitable means may be provided for maintaining this belt tight, such as an idler 128, mounted on a lever 129 pivoted to the frame at 130 with a spring 131 to hold the idler against the belt.

Mounted on the other end of the shaft 121 is a toothed ratchet-wheel 132 adapted to coact with a pivoted pawl 133 carried by an arm 134 and held in engagement with the periphery of the ratchet by a spring 135. Connected with the arm 134 is a connecting rod 136 carrying a strap 137 embracing an eccentric 138 carried by the main shaft 6, so that when the main shaft is rotated the pawl 133 will be reciprocated imparting a step by step movement to the wheel 132 and the shaft 121. Backward movement of the shaft and wheel will be prevented by stationary pawl 139 held against the ratchet-wheel by a spring 140. This pawl is eccentrically mounted on a bearing 141 so that by rotating this bearing the position of the pawl may be adjusted to adjust the position of the drums 122. To prevent the ratchet 132 and its shaft being rotated too far on movement of the arm 134, a brake is provided engaging the opposite sides of the ratchet 132. This brake comprises a pair of plates 142 mounted on opposite sides of the ratchet and having pads 143 engaging the surfaces of the ratchet. By adjusting a screw 144 passing through one plate and threaded in the other, the pressure of these pads on the ratchet, and therefore, their braking effect, may be adjusted. A handle or lever 145 is secured to the pawl 133 so that if desired it may be manually moved from engagement with the ratchet wheel to stop the feeding operation.

Mounted on suitable arms 146 is a rewind drum 147, and on one end of the shaft carrying this drum is a pinion 148 meshing with the gear 149, provided with a handle 150. Thus by rotating this gear the flexible strip of paper or other suitable material may be rewound on this drum as desired.

Mounted on the shaft 107 is a similar toothed ratchet-wheel 151. A pivoted arm 152 carries a pivoted pawl 153 held in engagement with the ratchet by a spring 154, and pivoted to this arm at a point 155 is a connecting rod 156, carrying at its other end a strap 157 embracing an eccentric 158 on the main shaft 6. Thus as the main shaft rotates the arm 152 is rocked by its pivot and through the pawl 153 will impart a step by step movement to the ratchet 151 and the drums 106. To prevent backward movement of these elements a pivoted pawl 159 is held in engagement with the ratchet by a spring 160. This pawl is also eccentrically mounted so that by rotating the eccentric mounting the position of the pawl may be adjusted to control the position of the pins on the drums 106. To prevent advancing of the drum too far on the feeding movement of the arm 152 two plates 161 are provided on opposite sides of the ratchet 151 carrying pads 162 engaging the sides of this ratchet. A screw 163 passing through one of these plates and threaded into the other may be adjusted to vary the pressure of the pads on the ratchet and to control their braking effect.

I provide on this machine a manual control for the punches and the mechanism for operating these punches. For this purpose I mount at the forward end of the machine a pair of brackets 164 and mounted between these brackets is a roll 165 preferably provided with a covering of soft rubber 166. This roll is mounted to rotate on suitable bearing blocks 167 and has knurled knobs 168 at its opposite ends for rotating the roll. For guiding and holding a sheet of paper against the roll I provide a sheet metal guide 169 resting on suitable supporting blocks 170, and connected at its forward edge by a link 171 to a lever 172, the link being pivoted at its opposite ends to the lever and the guide. This lever is mounted on a rod 173 and secured thereto by any suitable means, such as a set screw 174. Pivoted to the supporting blocks 170, as shown at 175, are a pair of paper roll brackets 176 and 177, each carrying at their free ends a roller 178. These two brackets are connected by a spring 179 tending to draw the free ends together to press the rollers 178 against the surface of the roll 165, and thus hold a sheet of flexible material, such as paper 180, tightly against the surface of the roll. Secured to the rod 173 is an arm 181 connected at its free end to a spring 182 which tends to hold the guide 169 against the under side of the roll 165.

In front of the roll 165 is a scale 183 calibrated with suitable numbered lines 189, as shown in Figs. 16 to 19. This scale is mounted on a supporting bar 190 on the underside of which is secured a rack 191 meshing with a pinion 192 carried by a rod 193 mounted to rotate in a stationary bearing 194. On the outer end of this rod is a knurled head 195 for rotating the rod and pinion and thus shifting the scale laterally of the machine or longitudinally of the front side of the roll 165. Also carried by the rod 73, and projecting in front of the scale where it is easily accessible, is an arm 196 terminating in the key 197 so that by pressing on this key the guide 169 may be moved away from the roll to release the paper or facilitate insertion of the paper around the roll.

Figure 5:
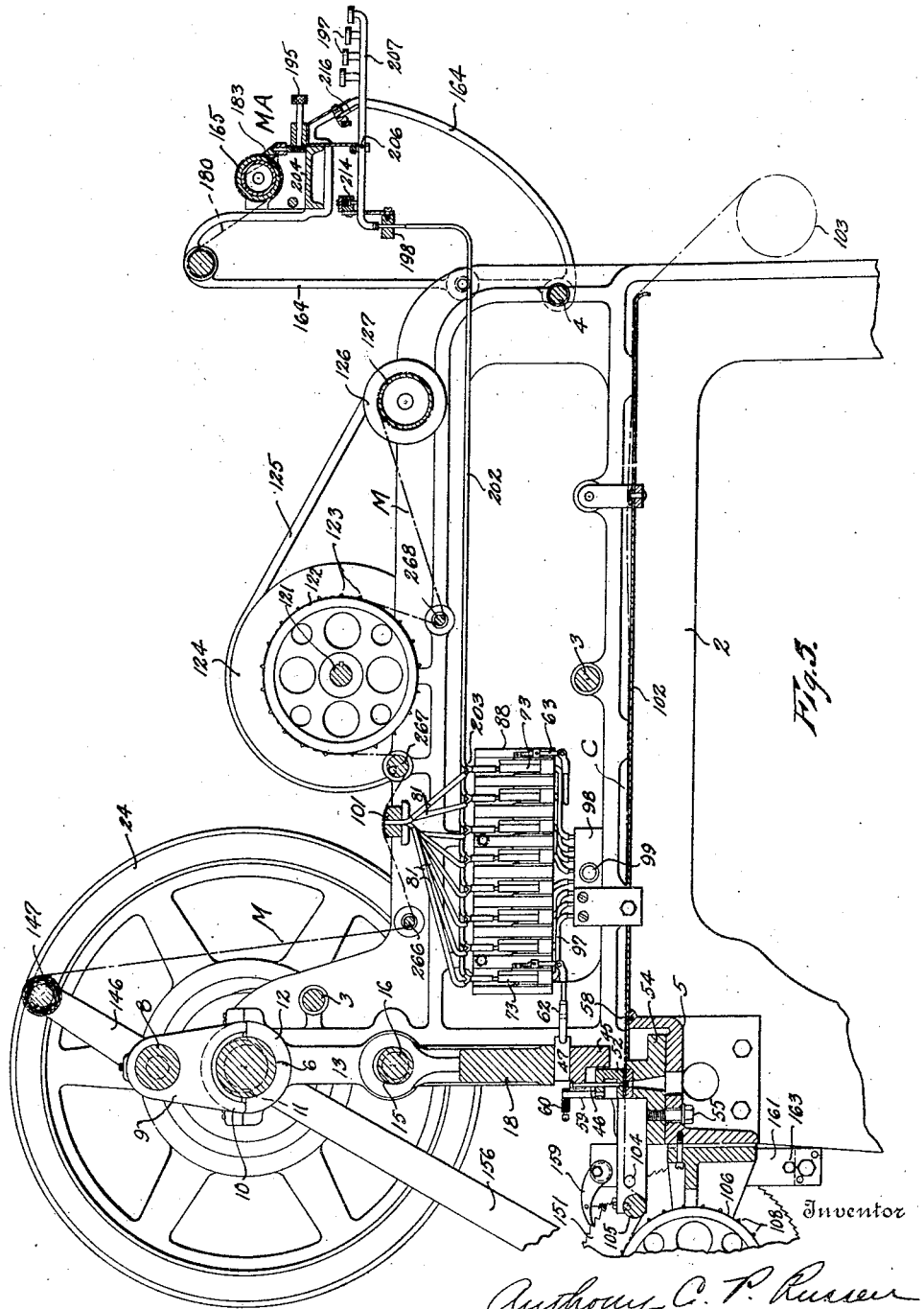
Fig. 5 is a longitudinal section through substantially the center of the machine.

Also carried between the brackets 164 is a subtracker bar 198 which may be mounted on the brackets by any suitable means, such as lugs 199, on which the ends of the bar rest and to which it may be secured by suitable screws 200. Extending vertically through the tracker bar are a plurality of tubes 201 open at their upper ends, the number of tubes corresponding to the number of punches, and from the lower end of each tube leads a flexible tubing 202 to a pneumatic action for the proper punch. In Fig. 5 I have shown this tube leading to a Y-connection 203 in the flexible tube 81 leading to the openings in the main tracker bar 101 so that the pneumatic action of each punch is controlled both by an opening in the main tracker bar 101 and also by a tube 201 in the subtracker bar 198. Projecting downwardly from the supporting bar 204 is a supporting plate 205 to which is hinged at 206 a plurality of key levers 207. These levers project forwardly and are tuned upwardly at their outer ends where each is provided with a key 208 carrying a suitable designation, as a number, as shown in Fig. 3. Adajcent their other ends the key levers 207 are provided with pads 209 adapted to engage the open ends of the tubes 201 and close the same against entrance of air. These levers are guided in slots 210 in a plate 211 secured to the tracker bar by any suitable means, such as screws 212, and this plate in turn carries a bar 213 carrying a plurality of reciprocable plungers 214. These plungers are pressed at their lower ends on the top of levers 207 by means of springs 215, and thus tend to hold the pads 209 against the open ends of the tubes 201 to keep them closed. Above the forward portion of the levers are a plurality of pivoted trip pins 216, one for each lever, which when the lever is in normal position to close the tube 201, as shown in full lines in Fig. 12, are inclined with their lower ends resting on the upper edges of the levers. Should a lever be depressed, however, by pressing on a key 208, the corresponding trip pins will drop to the vertical position shown in dotted lines and will hold the lever depressed until it is released. For the purpose of releasing these trip pins a trip bar 217 is provided hinged at its opposite ends adjacent its upper edge, as shown at 218, and this trip bar is located to the rear of the trip pins. Carried by the trip bar is a tripping lever 219 which projects to a suitable easily accessible position adjacent the keys, as shown in Fig. 12. When it is desired to release the levers all that is necessary is to raise the free end of the lever 219 which will swing the lower edge of the trip bar 217 against the trip pins 216 and swing their lower ends forwardly, releasing the levers and allowing them to move to the normal or full line position shown in Fig. 12 and close the open ends of the tubes 201.

In order that feed and guide openings for the pins 108 and 123 should be automatically punched in the sheet of flexible material, such as paper, indicated at 58, as this strip passes through the machine, I have provided at the rear of the machine and secured to the shaft 107 a ratchet 220. This ratchet has in its periphery a series of notches 221 adapted to coact with a pin 222 carried by a pivoted arm 223, this arm being pivoted at 224 to a suitable supporting bracket 225. The pin 222 is adjustable in the arm 223, and secured in adjusted position by any suitable means such as a set screw 226, and carries at its upper end a pad 227 adapted to engage and close the lower open end of a tube 228 adjustably carried by the lever 229, this lever being also pivoted at the point 224. This lever is provided with a downwardly projecting arm 230 carrying an adjusting screw 231 with its end adapted to engage the bracket 225. This screw may be secured in adjusted position by a lock nut 232. The tube 228 is connected by a flexible tube 233 and branches leading therefrom to three pneumatic actions for three different punches, two at the extreme outer ends of the row of punches at the opposite edges of the strip 58 and one in the center, which punches are for punching the openings 258 and 259 in the strip, as shown in Fig. 28, to coact with the pins on the drums 106 and 122. The action of this device is as follows:

As the shaft 107 is rotated the pin 222 when resting on the periphery of the ratchet 220 closes the tube 228 and thus maintains the slides 47 of the pneumatic actions to which this tube is connected, retracted and the corresponding punches inoperative, but as the ratchet is further rotated the pin 222 is periodically dropped into a notch 221. As it drops the end of screw 226 engages the supporting bracket 225 and retains the lower end of the tube 228 away from the pad 227, as shown in Fig. 6. This allows air to enter the tube 228 breaking the vacuum in the pneumatic actions and causes the corresponding slides 47 to be advanced over the corresponding punches. Then as the gate 18 is lowered to punch a row of holes of the design, these guide holes will be punched at the same time, as shown in Fig. 6. The number of notches 221 corresponds to the number of pins 108 on the drums.

Projecting from one side of the ratchet 220 is a lug 234, and secured on the shaft 107 by any suitable means such as a set screw 235 is a collar 236. This collar has a pair of spaced ears 237 carrying adjusting screws 238, and the lug 234 projects between the ends of these screws. Thus by adjusting these screws the position of the ratchet 220 about the shaft 107 may be adjusted to properly position this ratchet on the shaft and to insure reliable operation of the punch control mechanism.

Figure 8:
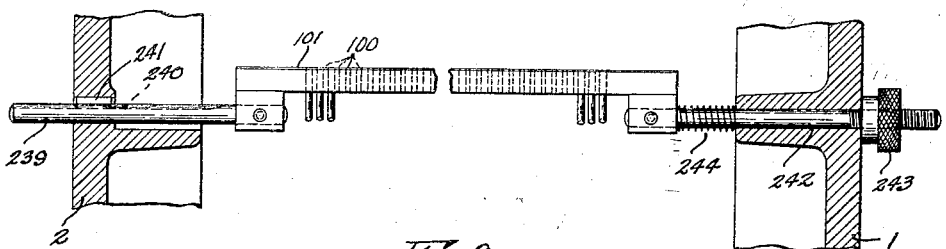
Fig. 8 is a side elevation of the main tracker bar in its adjustable mounting.

The main tracker bar 101 should be mounted so that it can be adjusted laterally of the strip of flexible material so as to properly position the openings therein. A suitable mounting is disclosed in Fig. 8. Secured to one end of the bar is a rod 239 projecting through and guided in an opening in the frame of the machine, and it is provided in one side with a key way 240 in which a feather 241 carried by the frame may slide, but which will hold the rod against rotation. Secured to the other end of the tracker bar is another rod 242 extending through an opening in the frame and threaded at its outer end for a knurled nut 243. A spring 244 embraces this rod between the frame and the tracker bar which tends to move the bar to the left, as viewed in Fig. 8, which movement will be limited by the nut 243. It will be obvious by adjusting the nut 243 the position of the tracker bar may be shifted.

For the purpose of operating the machine by hand in setting up or at any other time desirable, a hand wheel 245 is provided on the main shaft 6.

Suitable means are also provided for numbering the rows of holes punched and thus the cards for the design which is transferred to the strip of flexible material. I have shown in Figs. 20 and 21 a numbering device for this purpose. Carried by a bracket 246 is a stud 247 upon which is mounted to rotate a star 248 and a cam 249. The star and the cam are mounted on a bushing 250 which is rotatable on the stud, and the star and the cam are both secured to the bushing so that they will rotate together by any suitable means, such as set screws 251. The cam is adapted upon each revolution to engage a roller 252 carried on a sliding rod 253 which carries at its lower end the automatic numbering device 254. Mounted on the main shaft 6 is a disc 255 carrying the pin or stud 256 adapted upon each rotation of the shaft to engage one of the arms of the star and rotate it that fraction of a revolution. In the present instance as there are four arms on the star the star and the cam will make one revolution to four revolutions of the main shaft and thus the number will be impressed on the sheet of flexible material 58 as each fourth row of holes is punched therein.

I will now describe the method of punching a master roll with the master attachment. Referring to Fig. 28 I have shown a portion of a continuous strip of flexible material, such as paper, and the eight rows of holes indicated at (A) represent a portion of the strip corresponding to a jacquard card of a so-called French index of 416 holes, that is, on the head of the loom there are 416 needles arranged in eight horizontal rows of 52 needles to a row corresponding to the distance (B) Fig. 28, exclusive of the central row of guide holes 258 which are to receive the studs 108 or 123 on the central drums. The two outer rows of guide holes 259 are for the studs on the outer drums.

The row of holes 260 are so-called lift holes to control the lift of bobbins carrying different colored filling and so are strictly not a portion of the design. The showing in Fig. 28 is merely illustrative as with other indexes the number of holes and the number of needles may be varied as desired. In Fig. 29 I have shown a portion of a design sheet showing a design, this sheet having in each horizontal row 416 squares corresponding to the 416 needles of the French index, there being eight squares in the row to each block ($b$). Take for instance, row 1, the eight squares in this row in the first block $b^1$ correspond to the eight holes in the first vertical row of the card 261 shown in Fig. 28, the second eight squares in corresponding block $b^2$ correspond to the second row 262, and so on throughout the length of the row 1 and the card (A). I will now refer to Figs. 17, 18 and 19 in which a portion of a strip of the design is shown at 263. In these figures the design is shown with twelve squares in the horizontal block of each row instead of eight, as shown in Fig. 29, but the principle is the same in both cases. This design is placed on the roll 165 with the first row along the edge of the reading bar or the scale 183. Now each key 197 is depressed according to the numbers 189 which lie opposite colored blocks 264. When all the keys in the row corresponding to the lines which lie opposite colored blocks have been depressed the machine is tripped by pressing down on the trip pedal 26. This causes the main shaft 6 to make one revolution, pressing down the gate 18 and operating the punches which correspond to the keys which have been depressed to punch an entire row of holes across the master sheet corresponding to the first row of the eight rows of holes of the single control card (A) Fig. 28. After this row of holes has been punched the key trip lever 219 is raised releasing all the keys which have been pressed downwardly allowing them to assume the normal position to close the tubes 201 in the subtracker bar and cause the pneumatic devices to withdraw the slides 47 from their positions over the punches. The reading bar 183 is then moved one square to the left by means of the knurled head 195 acting through the rack and pinion 191—192 to the position shown in Fig. 18, and the keys corresponding to the numbers 189 opposite the colored blocks are again depressed throughout the length of the reading bar. When completed the machine is tripped again, punching the second row of holes throughout the entire length of the control card on the master. These operations are continued until the whole block 265 in Fig. 17 has been travelled. It will be clear that upon each revolution of the main shaft after the row of holes has been punched the strip of flexible material will automatically be advanced the distance between two horizontal holes by the feed mechanism 151—163 through the rotation of the drums 106. After line 1 has been completed corresponding to the card (A) Fig. 28, the design sheet 263 is advanced one line to bring line 2 at the edge of the reading bar and the process is repeated to punch the holes for the second card. After the master has been completed by transferring a whole design thereto, this master may be passed over the main tracker bar 101 and the design will be transferred to one or more strips of paper or other flexible material passed by the punches, as shown in Fig. 5. In this figure the master passing over the tracker bar is indicated at (M) while the copies to be punched are indicated at (C) but it will be obvious that when the master attachment indicated at (MA) in Fig. 5 is being operated to punch the master, the master strip will have the position of the strip (C). Thus the design punched in the master may be automatically transferred to the copies by merely passing it over the main tracker bar 101. In doing this the master is wound up on the rewind drum 147, passed under the guide bar 266, over the tracker bar 101, under the eccentrically mounted tension bar 267 corresponding to the tension bar 105, over the drums 122 and under the guide rod 268 to the windup drum 127. It is only necessary to punch one complete design in the master (M), or if the design is composed of a number of similar parts or sections only one section need be punched in the master. As this section is passed over the main tracker bar it will be transferred to the copy (C), but at the completion of the transfer of this section the machine is stopped, the master is wound on the rewind drum 147 by turning the crank 150 and then the section of the master is again passed over the tracker bar. This operation is repeated until the entire design has been transferred.

In present practice the design is read horizontally and one vertical row of holes on one control card is punched at a time. With my device an entire horizontal row of holes of a control card is punched at one time.

With this machine it is not necessary to cut both the plain weave holes and the design holes in the design strip, that is, in making a master to be run over the tracker bar direct to control the punching of copies, provided we intended to use a plain or a simple weave, at the time of making a master for a new design we would have a master for the plain or simple weave only. By passing this plain or simple weave master over the tracker bar we could transfer the plain weave holes to a strip passing by the punches, then use this strip as a base for the new master and again pass this strip under the punches while a strip having the design openings only is passed over the tracker bar. Thus the new master from which the copies for use in a loom were to be made would have both the plain weave and the design holes, but it is necessary to cut only the design holes in the design sheet. It will be obvious that this method will effect a great saving in time and labor in making the masters. Therefore, with this machine for each design it is necessary only to punch the design holes in the design strip, and a number of masters may be punched for the plain weaves only. Any desired plain weave from one of these masters may be automatically transferred to the proposed new master strip and then by passing this strip again through the machine any one of the designs may be punched in this new master strip without the necessity of punching the plain weave holes in the design strip. It is further contemplated that both the plain weave master and the design strip may be passed over the tracker bar at the same time in superimposed relation so that both the plain weave and the design openings are transferred to the new master at the same time.

To facilitate insertion and removal of the master the rewind drum 147 and the guides 266, 267 and 268 are mounted so that they may be easily removed and inserted in the machine. Drum 147, for instance, has a bearing at one end in a slidable rod 269 held against the end of the drum by a spring 270. By merely sliding the rod outwardly the drum may be removed or applied as will be obvious. The drum 147 is driven from pinion 148 by a tongue 147' in a groove. A similar construction is employed for the guides 266 and 268, these rods having a bearing at one end on sliding rods 271 and 272 respectively, which are pressed against the end of the rods by springs 273 and 274. By sliding these rods outwardly the guides may be easily removed or inserted. If it is desired at any time to stop the feed of the pawl 153 for the shaft 107 a lever 153' is provided whereby the operator may lift the pawl 153 from the ratchet 151.

I have described above how the master attachment is employed for reading and punching the holes in the master strip. This machine, however, may be employed to transfer the design directly to the copies without the necessity of using and operating the master attachment. I have shown in Fig. 30 how the design, a portion of which is shown in Fig. 29, may be transferred to a sheet to be passed over the main tracker bar 101, having 52 holes or the same number of holes as there are punches to punch the control strip (C) directly for French index. For this purpose the design (Fig. 29) is cut into strips $b^1$, $b^2$, and so forth, corresponding to the width of a control card (A) Fig. 28, it being understood that Fig. 29 shows only a portion of a design, the actual design sheet being much wider vertically than that shown. These narrow strips are placed by the side of similar strips of a larger scale with the squares spaced apart the same distance as the punches and the openings in the tracker bar and the design is transferred to these larger strips. Then these enlarged strips are placed on a continuous strip 275 (Fig. 30) with squares drawn to the same scale, but the narrow strips corresponding to $b^1$ (Fig. 29) and so forth, are turned through an angle of 90 degrees so that instead of lying vertical or longitudinally of the design sheet they will now lie horizontally or transversely of the sheet, as shown in Fig. 30, and they are placed in superimposed relation but with the end of each strip advanced one square to the right from the end of the next lower strip. The holes required for the design for the portion of the first row 1, (Fig. 29) carried by each strip $b^1$, $b^2$, $b^3$, and so forth, is transferred to the main strip 275 for all of the 52 strips. Thus the entire card is transferred to the strip 275 in proper position for the copies (C) and when this strip 275 is passed over the tracker bar the holes required in each horizontal row will be correspondingly punched in the copies (C). This is the first card corresponding to row 1 (Fig. 29). The same operation is repeated to transfer row 2 (Fig. 29) to the strip 275 but, of course, it will be advanced on this strip by the side of the first card and the openings shown by the lines in strips $b^1$, $b^2$, and so forth, corresponding to row 2 (Fig. 29) will be transferred to the strip 275, and so on until the whole design has been transferred to strip 275. By passing this strip over the tracker bar the corresponding openings for each horizontal row of the cards will be punched in succession, as will also be the complete cards.

I have shown in Figs. 31 and 32 another way in which the design may be transferred to copies (C) direct. In this method the tracker bar 101' is provided with as many openings as there are needles in the control head. In the drawings I have indicated 416 openings, that is, for use with a head having 416 hook controlling needles arranged in eight rows of 52 in a row. The showing is, however, merely illustrative and obviously the same principle may be used with heads having a different number of needles, for example 624 arranged in twelve rows of 52 holes each, or any number desired. But as there are only 52 punches corresponding to the maximum number of openings that may be required in a horizontal or longitudinal row of the control card, the openings are located (French index) in eight (or twelve for a 624 needle head as the case may be) groups of 52 holes each, and the pneumatic mechanism for each punch is connected to one opening in each group. But in order that the groups may be operated successively they are offset on the tracker bar a distance equal to one step by step movement of the master or design strip (M) as it is passed over the tracker bar, as shown in Fig. 31. Each group of 52 holes is indicated by letter (G) and the first opening $g^1$ for each group is connected to the first punch $p^1$ and the second opening $g^2$ of each group to punch $p^2$ and so on throughout the entire layout. The design, however, for use with this arrangement of tracker bar is arranged, as shown in Fig. 32, in which a continuous design strip is indicated at 276, the squares spaced distances equal to the distances between the punches and the openings in the tracker bar, and there being 416 (or 624 as the case may be) of these squares (for French index) in one horizontal or transverse row across the strip. In laying out the design on this strip the 52 holes corresponding to the first row of the design card represented by row 1 (Fig. 29) is transferred to the row 277 (Fig. 32) and in the first block $278^1$. It so happens that the first square $s^1$ $b^1$, $s^2$ $b^2$, and so forth in row 1 (Fig. 29) for each block $b^1$, $b^2$, and so forth, is not punched so that there are no openings in line 277 in the first block 278'. In block $278^2$, row 277, (Fig. 32) are provided the openings corresponding to the second horizontal line of the control card, these openings being represented by squares $s^2$ $b^1$, $s^2$ $b^2$, and so forth, and so on across the entire card 276. When the design sheet is passed over the tracker bar the openings in line 277 square $278^1$ will coact with the set of openings $G^1$ to punch the first horizontal row (Fig. 28) of the card (A). The holes in line 277, block $278^2$ will coact with the set of openings $G^2$ as the card 276 is advanced by the feed mechanism, to punch the second row (Fig. 28) and so on across the card. For punching the second card corresponding to row 2 (Fig. 29) the corresponding openings are provided in a row 279, but this row is spaced eight squares from the row 277 so that the last block $278^8$ will have passed from the last set of openings $G^8$ before the first block $278^1$ in row 279 reaches the first set of openings $G^1$. The whole design is thus laid out on the sheet 276 with each row of the design spaced eight rows apart and when then passed over the tracker bar as arranged in Fig. 31 it will punch the entire design in the sheets (C).

In Figs. 33 and 34 I have shown another arrangement of the openings in the tracker bar having the full number of openings corresponding to the number of needles in the control head, that is (French index) 416 arranged in eight horizontal rows of 52 each (or 624 in twelve horizontal rows of 52 each). In this arrangement, however, the openings 100 are arranged in the tracker bar 101², as shown in Fig. 33, in 52 groups of eight openings to a group, and the openings in each group are arranged on a 45 degree line to the longitudinal length of the tracker bar, and all of the openings of each group are connected to a single punch. Thus the openings in group $h^1$ are connected to punch $p^1$. All of the openings in group $h^2$ are connected to punch $p^2$ and so on. In this arrangement the openings are also arranged in eight horizontal rows of 52 holes each, as shown, with the openings of each spaced eight squares from each other. A portion of this strip of the design card for use with this tracker bar is shown at 280 in Fig. 34. The first row 281 has openings punched the same as row 1 of the design in Fig. 29, the second row 282 has openings corresponding to the openings in row 2 (Fig. 29) and so on throughout the entire design. When this strip is passed over the tracker bar (Fig. 33) the openings in row 1 of the tracker bar will coact with the first squares $s^1$ of each block $b^1$, $b^2$, and so forth, to punch the first row of the control card (A) Fig. 28. The openings in row 2 will coact with squares $s^2$ to punch row 2 of the control card, and so forth, throughout the entire row to punch the eight horizontal rows of the card corresponding to row 1 of the design (Fig. 29). When the second row 282 passes over the tracker bar it will punch the card corresponding to row 2 of the design (Fig. 29) and so on, but the rows 281 and 282 must be spaced eight squares apart so that the line 281 must have passed beyond row 8 (Fig. 33) before row 282 reaches row 1 (Fig. 33).

It is also contemplated to use a tracker bar with 52 holes (French index), or that is, a number corresponding with the number in a horizontal row of needles in the control head, and punch the cards direct by cutting the design into strips corresponding to the number of horizontal rows in the control card (French index eight strips). The first strip is then passed over the tracker bar punching the first horizontal row of each card of the design. After this strip has been passed through, the copies (C) are turned back to a position lacking only one row of the original position and the second strip of the design is passed over the tracker bar punching the second row of each card of the design. Then the strips (C) are turned back again lacking one row of the last position and the third strip of the design is passed through, and so on until the entire design has been punched. It will be apparent in this case, however, each step by step feed of the strip (C) must correspond to the distance between eight rows of openings on the card, or for each step by step feed of the design over the tracker bar the copies (C) must be advanced eight step by step movements of the ordinary single spacing.

Having thus set forth the nature of my invention, what I claim is:

1. In combination, a plurality of punches, pneumatic actions for operating said punches, manually operable means to control the said pneumatic actions to punch holes in a strip of flexible material to produce a master, and a tracker bar having openings therein connected with said pneumatic actions and, adapted to coact with said master to control the punches to punch corresponding openings in one or more strips of flexible material.

2. In a machine of the character described, manually controlled pneumatically operated means for punching holes in a continuous strip of flexible material according to a given design to produce a master, and means adapted to coact with said master to control said pneumatically operated means to punch similarly arranged holes in one or more continuous strips of flexible material to form copies of the master.

3. In a machine of the character described, a plurality of punches, a plurality of pneumatic actions for controlling said punches, a main tracker bar adapted for passage of a perforated strip thereover and having a plurality of openings, connections from said openings to said pneumatic actions, a sub-tracker bar provided with a plurality of openings, connections from said openings to the pneumatic actions, and manually operable means for normally closing said latter openings.

4. In a machine of the character described, a punch, a pneumatic action for controlling said punch comprising a vacuum tube, a casing having spaced elastic diaphragms providing a chamber between them, a connection from said chamber to the vacuum tube, one side of one of said diaphragms being exposed to atmospheric pressure and the other side of the other diaphragm forming one side of another chamber, a restricted connection from the latter chamber to the vacuum tube, a connection from said chamber to the atmosphere, means for controlling said connection, and means connected with the diaphragms for controlling the operation of the punch.

5. In a machine of the character described, a punch, a pneumatic action for controlling said punch comprising a block having an opening extending through the opposite sides thereof, diaphragms covering the openings on opposite sides of the block, one of said diaphragms being exposed on its outer side to atmospheric pressure, means connected with said diaphragm for controlling said punch, a cap having a chamber enclosing the other diaphragm, means connecting the chamber between the diaphragms to a partial vacuum, a restricted connection from the other chamber to said partial vacuum, a connection from the latter chamber to the atmosphere, and means for controlling said latter connection.

6. In a machine of the character described, a plurality of punches, a plurality of pneumatic actions for operating said punches including a vacuum tube, means connected with said tube for producing a partial vacuum therein, said tube having a plurality of openings in the top thereof, a block carrying a diaphragm providing a chamber, means connected with said diaphragm for controlling a punch, a connection from the chamber to the atmosphere, means for controlling said connection, a tube leading from the chamber and seated in an opening in the vacuum tube, and backing plates secured to the opposite sides of the tube and extending on opposite sides of the block to retain it on the tube, one of said plates being a spring plate.

7. In a machine of the character described, a plurality of punches, a plurality of pneumatic actions for operating said punches comprising one or more vacuum tubes, means connected with said tube or tubes for producing a partial vacuum therein, said tubes having a plurality of openings in the tops thereof, a block carrying a pair of spaced diaphragms providing a chamber, one of said diaphragms being exposed to the atmosphere, means connected with said diaphragm for controlling a punch, a cap having a chamber enclosing the other diaphragm, a connection from the latter chamber to the atmosphere, means for controlling said connection, a restricted outlet from said chamber, and tubes leading from the restricted outlet and the other chamber and seated in the openings in the vacuum tubes.

8. In a machine of the character described, a plurality of punches, a plurality of means for controlling these punches, a plurality of manually operable means for controlling the punch controlling means adapted to assume two different positions, and individual automatic means for holding the manually operable means in the second position after operation thereof.

9. In a machine of the character described, a plurality of punches, a plurality of means for controlling these punches, a plurality of manually operable means for controlling the punch controlling means adapted to assume two different positions, automatic means for holding the individual manually operable means in the second position after operation thereof, and means for releasing the said holding means.

10. In a machine of the character described, a plurality of punches, a plurality of means for controlling said punches, a plurality of manually operable keys for controlling the punch controlling means, means for normally holding the keys in position to render the punches ineffective, means for holding the individual keys after operation in position to render the corresponding punches effective, and means for releasing the keys to allow movement thereof to normal position.

11. In a machine of the character described, a plurality of punches, a plurality of pneumatically operated means for controlling said punches, a plurality of tubes leading from said pneumatically operated means and terminating in open ends, a plurality of keys adapted to close said open ends and movable away therefrom to open said ends, means tending to move the keys to closing position, automatic means for holding the individual keys in open position after operation, and means for releasing said keys to allow movement to closing position.

12. In a machine of the character described, a plurality of punches, a plurality of movable keys for controlling said punches, a plurality of holding elements hinged above the keys and normally in an inclined position with their lower ends resting on the keys, said elements being each adapted when its corresponding key is depressed to assume a substantially vertical position and hold the key in depressed position, and means for swinging the elements to the inclined position to release the keys.

13. In a machine of the character described, a plurality of punches, a plurality of movable keys for controlling said punches, a plurality of holding elements hinged above the keys and normally in an inclined position with their lower ends resting on the keys, said elements being each adapted when its corresponding key is depressed to assume a substantially vertical position and hold the key in depressed position, a movable bar extending at one side of said elements, and means for moving said bar to swing the elements to the inclined position to release the keys.

14. In a machine of the character described, a support for a design sheet, a numbered scale adjacent the design sheet, means for adjusting the scale transversely of the sheet, a plurality of punches, a plurality of means for controlling the punches, and a plurality of numbered keys for controlling the punch controlling means.

15. In a machine of the character described, a support for a design sheet, means for advancing the design sheet, a numbered scale adjacent the design sheet, means for adjusting the scale transversely of the design sheet, a plurality of punches, a plurality of means for controlling the punches, and a plurality of keys numbered to correspond with the scale for controlling the punch controlling means.

16. In a machine of the character described, a plurality of punches, means for selecting individual punches for operation, manually operable means for controlling the selecting means, means for operating the punches selected to produce a master, and means adapted to coact with the master to control the selecting means.

17. In a machine of the character described, a support for a design sheet, a numbered scale adjacent the design sheet, means for causing relative movement between the scale and the design sheet, a plurality of punches, means for selecting indiviual punches for operation, manually operable means for controlling the selecting means and numbered to correspond with the scale, and means for operating the punches selected.

18. In a machine of the character described, means for supporting a design sheet comprising a roll, a curved guide embracing one side of the roll, supports for the rear edge of the guide, one or more levers having pivotal connection with the guide adjacent the forward edge thereof, and a spring tending to rock said lever or levers to retain the forward portion of the guide against the roll.

19. In a machine of the character described, means for supporting a design sheet comprising a roll, a pair of levers, rollers carried by the levers, said levers being fulcrumed so that the rollers may engage the roll at spaced points, and a spring connecting said levers and tending to press the rollers against the roll.

20. In a machine of the character described, a plurality of punches, means for controlling said punches including a plurality of conduits having openings therein, means for controlling said openings comprising a plurality of levers fulcrumed on a common rod, closures for said openings carried by said levers, a guide plate having a plurality of slots through which the levers extend and in which they are guided, means tending to hold the levers in closed position, and means carried by the levers whereby they may be manually operated to uncover the openings.

21. In a machine of the character described, a plurality of punches, a plurality of pneumatics for controlling the operation of said punches, a tracker bar provided with a plurality of orifices, connecting tubes from the orifices to the pneumatics, a vacuum tube for supporting a plurality of said pneumatics having openings therein, tubular connections from said pneumatics to the vacuum tube seated in said openings, plates secured to the vacuum tube and extending on opposite sides of the pneumatics to retain them on the tube, one of said plates being a spring plate, and means for creating a suction in said tube.

22. In combination, a plurality of punches, a plurality of slides for controlling said punches, a plurality of substantially parallel vacuum tubes, a plurality of pneumatics carried by each tube with the pneumatics on one tube offset laterally the distance between the slides from the corresponding pneumatics on the adjacent tubes, tubular connections from the pneumatics to their supporting tubes, a tracker bar having a plurality of orifices, and tubular connections from the orifices to the pneumatics.

23. In combination, a plurality of punches, means for operating the punches, means for feeding a strip of flexible material past said punches comprising a rotatable drum having projecting studs in its periphery to enter correspondingly spaced holes in the strip, and a flat spring stripper having a free end resting on the periphery of the drum to strip the flexible strip from the studs as the drum is rotated.

24. In a machine of the character described, means for advancing a strip of flexible material comprising a rotatable drum having a series of studs projecting from its periphery adapted to enter correspondingly spaced holes in the strip, said drum being also provided with a peripheral groove, a support, and a stripper carried by said support comprising a flat spring having its free end resting on the drum in said groove to strip the flexible strip from the pins as the drum is rotated.

25. In combination, means for advancing a strip of flexible material comprising a rotatable drum having a series of studs projecting from its periphery adapted to enter correspondingly spaced holes in the strip, an eccentrically pivoted guide for the strip adjacent one side of the drum, and means for turning the guide to shift it on its pivot and adjust the position of the strip.

26. In combination, a tracker bar having a plurality of orifices, means for passing a perforated flexible strip over the tracker bar comprising a rotatable drum having a plurality of projecting studs in its periphery adapted to enter correspondingly spaced openings in the strip, guides for the strip on opposite sides of the tracker bar, one of said guides being eccentrically mounted on pivots, means for turning said guide to adjust the position of the strip, and means for rotating the drum.

27. In combination, a plurality of punches, means for operating the punches, means for advancing a strip of flexible material past said punches comprising a rotatable drum having a series of projecting studs in its periphery adapted to enter correspondingly spaced holes in the strip, means for rotating the drum, an eccentrically pivoted guide for the flexible strip between the drum and the punches, and means for turning the guide on its pivots to adjust the position of the strip.

28. In combination, a plurality of punches, means for advancing one or more sheets of flexible material past said punches, pneumatics for controlling the operation of the punches, a tracker bar having a plurality of orifices, tubular connections from the orifices to the pneumatics, means for advancing a perforated master over the tracker bar comprising a rewind drum, means for drawing the master from the drum and over the tracker bar, a windup drum for the master beyond the tracker bar, and means for operating the rewind drum independently of the means for advancing the sheets past the punches for rewinding the master on the rewind drum.

29. In combination, a plurality of punches, means for advancing one or more sheets of flexible material past said punches including a drum having studs projecting from its periphery adapted to enter correspondingly spaced openings in said strip or strips, means for controlling the operation of said punches, and adapted to cooperate with a master, means for advancing the master over said controlling means to control the operation of said punches including a drum having studs projecting from its periphery adapted to enter correspondingly spaced openings in the master, and means for driving said drums connected together so as to operate the drums in a given relation.

30. In combination, a plurality of punches, a rotatable drum, means for rotating the drum, a plurality of projecting pins about the periphery of the drum adapted to enter correspondingly spaced openings in a strip of flexible material to advance said strip past said punches, a punch for punching said openings, means connected with the drum for controlling said punch, and means for adjusting said controlling means about the axis of the drum.

31. In combination, a plurality of punches, a rotatable drum, means for rotating the drum, a plurality of projecting pins about the periphery of the drum adapted to enter correspondingly spaced openings in a strip of flexible material to advance said strip past said punches, a punch for punching said openings, a ratchet provided with notches in its periphery, means adapted to coact with said notches for controlling said punch, a lug carried by the ratchet, a support mounted to rotate with the drum, and adjusting screws carried by said support and engaging opposite sides of said lug whereby the ratchet may be adjusted about the axis of the drum.

32. In combination, a plurality of punches, a rotatable drum, means for rotating the drum, a plurality of projecting pins about the periphery of the drum adapted to enter correspondingly spaced openings in a strip of flexible material to advance said strip past said punches, a punch for punching said openings, controlling means for said punch, a ratchet mounted to rotate with the drum and provided with notches about its periphery, a pivoted lever, a pin carried by said lever adapted to rest on the periphery of said ratchet and enter said notches, a second pivoted lever, an open ended tube carried by the second lever a tube leading from said open ended tube to the punch controlling means, means carried by the first lever for closing the open ended tube and means for limiting movement of the second lever.

33. In combination, a plurality of punches, a rotatable drum, means for rotating the drum, a plurality of projecting pins about the periphery of the drum adapted to enter correspondingly spaced openings in a strip of flexible material to advance said strip past said punches, a punch for punching said openings, a pair of pivoted levers adapted for relative movement, a ratchet mounted to rotate with the drum, coacting means carried by the levers for controlling said punch, and coacting means carried by one of the levers and the ratchet for operating said controlling means.

34. In combination, a punch, a pneumatic device for controlling said punch, a rotatable ratchet having a plurality of teeth in its periphery, a pair of pivoted levers adapted for relative movement, coacting means carried by the levers, a connection from said means to the pneumatic device, and means carried by one of said levers adapted to coact with the ratchet to operate said coacting means.

35. In combination, a punch, means for controlling said punch, a pair of pivoted levers adapted for relative movement, coacting means carried by the levers for controlling the punch controlling means, a rotatable element, and means carried by the rotating element to cause said relative movement to control the punch.

36. In combination, a punch, a pneumatic device for controlling the punch, a rotatable ratchet having a plurality of notches in its periphery, a pair of pivoted levers, an open ended tube carried by one of said levers, a connection from said tube to said pneumatic device, means carried by the other lever adapted to coact with the ratchet to raise and lower the lever, means carried by said lever adapted to close the tube carried by the first lever when the second lever is raised, and means to limit the downward movement of the first lever.

37. In a machine of the character described, a plurality of punches, means for advancing a strip of flexible material past said punches with a step by step movement, pneumatics for controlling the operation of said punches, means for reciprocating the punches, a main tracker bar having a plurality of orifices therein, connections from said orifices to said pneumatics, means for passing a perforated master over the tracker bar with a step by step movement and in certain timing relation with the movement of the first mentioned strip, manually operable means for controlling the step by step movement, and manually operable means for controlling the operation of the individual punches.

38. In a machine of the character described, a plurality of punches, a plurality of slides for controlling the punches, pneumatics for controlling the slides and through these slides to select punches for operation, means for operating the punches selected, means for advancing a strip of flexible material past the punches with a step by step movement in certain timing relation with the operation of the punches, a main tracker bar having orifices therein, means connecting the orifices with the pneumatics, means for advancing a perforated master over the tracker bar with a step by step movement and in certain timing relation with the operation of the punches, a subtracker bar having orifices, connections from said orifices to the pneumatics, and manually operable means for covering and uncovering the individual orifices to control the pneumatics.

39. In a machine of the character described, a row of punches, means for advancing a strip of flexible material past said punches with a step by step movement, means for operating the punches including a rotating element, an automatic numbering device adapted to impress serial numbers on the flexible strip, a rotatable cam for operating the numbering device, a star having a plurality of arms connected with said cam, and a projection carried by the rotating element adapted upon each revolution to engage an arm of the star and advance said cam.

40. In combination, a plurality of punches in a line and equal in number to the maximum number of holes required in a longitudinal line of a Jacquard or similar loom control card, means for feeding a continuous strip of flexible material past said punches with a step by step movement in a direction transverse to the line of the punches, means for selecting certain punches for operation throughout the length of the line, and means for operating the punches selected in certain timing relation with the operation of the feeding means to punch at one operation the openings of a complete longitudinal line of a control card transversely of the strip.

41. In combination, a plurality of punches in a line and equal in number to the maximum number of holes required in a longitudinal line of a Jacquard or similar loom control card, means for feeding a continuous strip of flexible material past said punches with a step by step movement in a direction transverse to the line of the punches, means for selecting certain punches for operation throughout the length of the line, manually operable means for controlling said selecting means, means for operating the punches selected in certain timing relation with the operation of the feeding means to punch at each operation the openings of a complete longitudinal line of a control card transversely of the strip to produce a master, and means adapted to coact with said master to select said punches to punch similar openings in one or more strips of flexible material to produce copies of the master.

42. In combination, a plurality of punches in a line and equal in number to the maximum number of holes required in a longitudinal line of a Jacquard or similar loom control card, means for feeding a continuous strip of flexible material past said punches with a step by step movement in a direction transverse to the line of the punches, means for selecting certain punches for operation throughout the length of the line including pneumatics, manually operable means for controlling said pneumatics, means for operating the punches selected in certain timing relation with the operation of the feeding means to punch at each operation the openings of a complete longitudinal line of a control card transversely of the strip, a tracker bar having orifices, connections from said orifices to the pneumatics, and means for passing a perforated strip over said tracker bar in certain timing relation with the operation of said punches.

43. In combination, a plurality of punches in a line and equal in number to the maximum number of holes required in a longitudinal line of a Jacquard or similar loom control card, means for feeding a continuous strip of flexible material past said punches with a step by step movement in a direction transverse to the line of the punches, means for selecting certain punches for operation throughout the length of the line including pneumatics, a tracker bar provided with orifices, connections from said orifices to the pneumatics, manually operable keys for controlling said orifices, a second tracker bar provided with orifices, means connecting said orifices with the pneumatics, means for passing a perforated strip of flexible material over said second tracker bar with a step by step movement, and means for operating the punches selected in certain timing relation with the operation of the feeding means to punch at each operation the openings of a complete longitudinal line of a control card transversely of the strip.

44. In combination, a plurality of punches in a line and equal in number to the maximum number of holes required in a longitudinal line of a Jacquard or similar loom control card, means for feeding a card past said punches in a direction transverse to the line of the punches, means for selecting certain punches for operation throughout the length of the line, and means for operating the punches selected to punch at one operation the openings of a complete longitudinal line of a control card.

45. In combination, a plurality of punches in a line and equal in number to the maximum number of holes required in a longitudinal line of a Jacquard or similar loom control card, means for feeding a continuous strip of flexible material past said punches in a direction transverse to the line of the punches, means for controlling the operation of the punches, and means for passing one or more continuous masters over said punch control means to cooperate therewith in producing one or more copies of the master or masters.

46. In combination, a plurality of punches, means for controlling said punches, means for feeding one or more strips of flexible material past said punches, means adapted to coact with a master for controlling the punch controlling means, and means for feeding a plurality of masters in superimposed relation past said means.

47. In combination, a plurality of punches, means for controlling said punches including pneumatics, a tracker bar having orifices, means connecting the orifices and the pneumatics, means for feeding suitable material past said punches, and means for feeding a plurality of perforated masters over said tracker bar in superimposed relation.

48. In combination, a plurality of punches in a line and equal in number to the maximum number of holes required in a longitudinal line of a Jacquard or similar loom control card, means for feeding one or more strips of flexible material past said punches in a direction transverse to the line of the punches, means for selecting certain punches for operation throughout the length of the line, a tracker bar having orifices, means connecting the orifices with the selecting means, and means for feeding a plurality of perforated masters in superimposed relation over the tracker bar.

49. In combination, a plurality of punches in a line and equal in number to the maximum number of holes required in a longitudinal line of a Jacquard or similar loom control card, means for feeding a continuous strip of flexible material past said punches with a step by step movement in a direction transverse to the line of the punches, means for selecting certain punches for operation throughout the length of the line including pneumatics, a tracker bar provided with orifices, means connecting the orifices with the pneumatics, means for operating the punches selected in certain timing relation with the operation of the feeding means to punch at one operation the openings of a complete longitudinal line of a control card transversely of the strip, and means for feeding a plurality of continuous perforated masters in superimposed relation over the tracker bar and in certain timing relation with the feed of the first mentioned strip.

50. In combination, a plurality of punches in line and equal in number to the maximum number of holes required in one of a plurality of longitudinal lines of a Jacquard or similar loom control card, means for feeding a card past said punches in a direction transverse to the line of the punches, operating means for said punches, a tracker bar having as many orifices as there are needles in the control head with which the card is to be used and arranged in groups spaced transversely of the bar, the number of openings in each group corresponding to the number of punches, means for connecting the operating means for each punch to an opening in each group, and means for passing transversely over the tracker bar a design sheet provided with openings in a single transverse row to punch the openings required in an entire card.

51. In combination, a plurality of punches in line and equal in number to the maximum number of holes required in one of a plurality of longitudinal lines of a Jacquard or similar loom control card, means for feeding a loom control card past said punches, means for controlling said punches including a tracker bar having as many orifices as there are needles in the control head with which the card is to be used, and means for passing over said bar a design sheet perforated according to a given design with the openings for an entire card arranged in a single transverse line, the openings in the bar being so arranged and connected to the punch controlling means as to punch each of the longitudinal lines of the card complete in one operation and these lines in succession as the design passes over the tracker bar.

52. In combination, a plurality of punches in line and equal in number to the maximum number of holes required in one of a plurality of longitudinal lines of a Jacquard or similar loom control card, means for feeding a loom control card past said punches with a step by step movement, a tracker bar, means for feeding a design sheet over said tracker bar with a step by step movement, said bar having as many orifices as there are needles in the control head with which the card is to be used arranged in groups with the groups spaced from each other transversely of the bar a distance equal to the step by step movement of the sheet, the number of openings in each group corresponding to the number of punches, and means for connecting the operating means for each punch to an opening in each group, the design sheet being punched with the openings for each card arranged in a single transverse line and the lines on the sheet being spaced from each other a greater distance than that between the two outside groups of openings in the tracker bar.

53. The method of perforating a master strip for a control for a Jacquard or similar loom which consists in feeding the strip through punching mechanism controlled by a tracker bar, simultaneously passing over said bar a master perforated to correspond with the plain weave desired, and then again passing the strip through the punching mechanism and simultaneously passing over the tracker bar a strip punched to correspond with the design desired.

54. The method of perforating a master strip for a control for a Jacquard or similar loom which consists in providing a master punched to correspond with the plain weave and a separate master punched to correspond with the desired design, then passing the strip to be punched successively through a punching mechanism controlled by a tracker bar and simultaneously passing one of the masters over the tracker bar with the first passage of the strip through the punching mechanism and passing the other master over the tracker bar simultaneously with the second passage of the strip through the punching mechanism.

In testimony whereof I affix my signature.

ANTHONY C. P. RUSSEN.